: # (12) United States Patent
Matoishi et al.

(10) Patent No.: US 9,534,112 B2
(45) Date of Patent: Jan. 3, 2017

(54) MOLDED ARTICLE

(75) Inventors: Kaori Matoishi, Düsseldorf (DE); Takuma Yano, Chiba (JP); Hiromasa Marubayashi, Chigasaki (JP); Naoki Tomoshige, Oamishirasato (JP); Naoshi Nagai, Chiba (JP); Tamotsu Harada, Chiba (JP); Kuniaki Kawabe, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 529 days.

(21) Appl. No.: 13/980,950

(22) PCT Filed: Jan. 18, 2012

(86) PCT No.: PCT/JP2012/000260
§ 371 (c)(1),
(2), (4) Date: Jul. 22, 2013

(87) PCT Pub. No.: WO2012/098865
PCT Pub. Date: Jul. 26, 2012

(65) Prior Publication Data
US 2013/0344273 A1 Dec. 26, 2013

(30) Foreign Application Priority Data
Jan. 21, 2011 (JP) .................................. 2011-011172

(51) Int. Cl.
| | | |
|---|---|---|
| *C08L 23/26* | (2006.01) | |
| *C08L 83/08* | (2006.01) | |
| *C08L 101/10* | (2006.01) | |
| *C08L 83/00* | (2006.01) | |
| *C08L 83/04* | (2006.01) | |
| *C08F 110/02* | (2006.01) | |
| *C08F 10/00* | (2006.01) | |

(52) U.S. Cl.
CPC ................ *C08L 23/26* (2013.01); *C08L 83/00* (2013.01); *C08L 83/04* (2013.01); *C08L 101/10* (2013.01); *C08F 10/00* (2013.01); *C08F 110/02* (2013.01); *Y10T 428/1397* (2015.01); *Y10T 428/249921* (2015.04)

(58) Field of Classification Search
CPC ........... C08L 23/26; C08L 43/04; C08L 83/00; C08L 83/04; Y10T 428/1397; Y10T 428/249921; Y10T 428/31663; Y10T 428/1452; C08F 10/00; C08F 110/02; C08F 2810/40; C08F 8/42

USPC .... 428/447, 41.3, 41.4, 221, 36.92; 525/240
See application file for complete search history.

(56) References Cited

U.S. PATENT DOCUMENTS 5,728,469 A    3/1998  Mann et al.
7,247,385 B1   7/2007  Tzoganakis et al.

FOREIGN PATENT DOCUMENTS

| JP | 6-41500 A | 2/1994 |
|---|---|---|
| JP | 2002-522604 A | 7/2002 |
| JP | 2003-73412 A | 3/2003 |
| JP | 2004-35813 A | 2/2004 |
| JP | 2004-149552 A | 5/2004 |
| JP | 2004-196883 A | 7/2004 |
| JP | 2006-206844 A | 8/2006 |
| JP | 2008-133320 A | 6/2008 |
| JP | 2009-256655 A | 11/2009 |
| JP | 2010-37555 A | 2/2010 |
| JP | 2011-26448 A | 2/2011 |
| WO | WO 2008/004514 A1 | 1/2008 |

OTHER PUBLICATIONS

Extended Search Report issued in corresponding European Patent Application No. 12736829 on May 8, 2015 (9 pages).
International Search Report (PCT/ISA/210) issued on Mar. 19, 2012, by the Japanese Patent Office as the International Searching Authority for International Application No. PCT/JP2012/000260.

*Primary Examiner* — Yan Lan
(74) *Attorney, Agent, or Firm* — Buchanan, Ingersoll & Rooney PC

(57) ABSTRACT

A molded article formed of a composition including 100 parts by weight of at least one kind of resin selected from the group consisting of thermoplastic resins and thermosetting resins, and 0.01 parts by weight to 10,000 parts by weight of a silylated polyolefin, which is obtained by a reaction between a silicon-containing compound containing a structural unit represented by Formula (1) and a vinyl group-containing compound having a defined number average molecular weight, a derivative thereof, or a mixture of these, $$-\mathrm{Si}(R^1)H-Y^1- \qquad (1)$$

wherein $R^1$ and $Y^1$ are defined and with the proviso that the silylated polyolefin is not obtained by a reaction between a silicon-containing compound containing a structural unit represented by Formula (1) and having two or more SH groups per molecule and a compound having 2.0 or more vinyl groups on average per molecule as the vinyl group-containing compound.

14 Claims, No Drawings

MOLDED ARTICLE

TECHNICAL FIELD

The present invention relates to a molded article. More specifically, the present invention relates to a molded article formed of a composition containing a predetermined silylated polyolefin and a resin.

BACKGROUND ART

Resins represented by thermoplastic resins or thermosetting resins are used in various fields, since they are inexpensive and relatively easily molded. However, depending on the type of the resins, some resins are avoided for uses that require molded products obtained by molding the resins to have scratch resistance or soil resistance.

As an attempt at modifying properties of a resin, Patent Document 1 discloses modification of a specific low-molecular weight ethylene-based polymer which has a vinyl or vinylidene type unsaturated bond on the one terminal of the polymer. Patent Document 1 also discloses that an oligomer having a silicon-containing group, a tin-containing group, or the like is suitable as a polyvinyl chloride lubricant or a lubricant such as engineering plastic. As another attempt at modifying properties of a resin, Patent Document 2 discloses an attempt at reacting, for example, a low-molecular weight polyethylene oligomer with hydrogen silicone. In addition, Patent Document 3 discloses an attempt at applying a composition solidifying at room temperature, which contains a silicone-modified olefin wax obtained by hydrosilylating an olefin-based wax by using hydrosilicone, to cosmetics. Moreover, Patent Document 4 discloses a composition which includes a polyolefin containing terminal double bonds in a specific number and a cross-linking agent such as a silicon-containing compound.

RELATED DOCUMENT

Patent Document

[Patent Document 1] Japanese Unexamined Patent Publication No. 2003-73412
[Patent Document 2] Japanese Unexamined Patent Publication No. 2004-196883
[Patent Document 3] Japanese Unexamined Patent Publication No. 2004-149552
[Patent Document 4] Japanese Unexamined Patent Publication No. 2004-35813

DISCLOSURE OF THE INVENTION

However, Patent Document 1 dose not disclose the improvement of scratch resistance of a molded article formed of the resin. In addition, Patent Document 2 and 3 do not disclose the application of the attempt to a molded article. Patent Document 4 discloses an attempt at expressing excellent properties such as abrasion resistance by crosslinking a polyolefin, but this does not aim to improve scratch resistance of any resin by crosslinking.

The present invention has been made in consideration of the above circumstances, and provides a molded article having excellent scratch resistance and soil resistance.

According to the present invention, there is provided a molded article formed of a composition comprising 100 parts by weight of at least one kind of resin selected from a group consisting of thermoplastic resins and thermosetting resins, and 0.01 parts by weight to 10,000 parts by weight of a silylated polyolefin, which is obtained by a reaction between a silicon-containing compound containing a structural unit represented by Formula (1) and a vinyl group-containing compound having a number average molecular weight of equal to or more than 100 and equal to or less than 500,000 that is measured by GPC (here, a case that uses a compound having 2 or more SiH groups per molecule as the silicon-containing compound and a compound having 2.0 or more vinyl groups on average per molecule as the vinyl group-containing compound, is excluded), a derivative thereof, or a mixture of these.

$$-Si(R^1)H-Y^1- \quad (1)$$

(In Formula (1), $R^1$ represents a hydrogen atom, a halogen atom, or a hydrocarbon group, and $Y^1$ represents O, S, or $NR^{30}$ ($R^{30}$ represents a hydrogen atom or a hydrocarbon group).)

In the above molded article, the silicon-containing compound is preferably represented by the following structural formula.

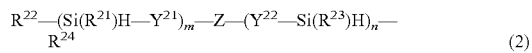

$$R^{22}-(Si(R^{21})H-Y^{21})_m-Z-(Y^{22}-Si(R^{23})H)_n- \atop R^{24} \quad (2)$$

(In Formula (2), each of $R^{21}$ and $R^{23}$ independently represents a hydrogen atom, a halogen atom, or a hydrocarbon group, each of $R^{22}$ and $R^{24}$ independently represents a halogen atom or a hydrocarbon group, each of $Y^{21}$ and $Y^{22}$ independently represents O, S, or $NR^{30}$ ($R^{30}$ represents a hydrogen atom or a hydrocarbon group), m represents 0 or 1, n represents 0 or 1, when there are plural $R^{21}$s, $R^{23}$s, $Y^{21}$s and $Y^{22}$s, the respective groups may be the same as or different from each other, Z represents a divalent group represented by Formula (3),

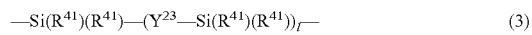

$$-Si(R^{41})(R^{41})-(Y^{23}-Si(R^{41})(R^{41}))_l- \quad (3)$$

(In Formula (3), $R^{41}$ represents a hydrogen atom, a halogen atom, or a hydrocarbon group, each $R^{41}$ may be the same as or different from each other, each $Y^{23}$ independently represents O, S, or $NR^{30}$ ($R^{30}$ represents a hydrogen atom or a hydrocarbon group), and l represents an integer of 0 to 10,000.), here, when m=n=0 in the Formula (2), at least one $R^{41}$ represents a hydrogen atom in the Formula (3).)

In the molded article, the silicon-containing compound may contain 3 or more silicon atoms.

In the Formula (2), m=n=1, and all of $R^{21}$, $R^{23}$, and $R^{41}$ may be hydrocarbon groups.

In the Formula (2), m=1, n=0, and all of $R^{21}$ and $R^{41}$ may be hydrocarbon groups.

In the molded article, the vinyl group-containing compound may have a structure represented by Formula (4).

$$A-CH=CH_2 \quad (4)$$

(In Formula (4), A represents a polymer chain having a structure derived from an α-olefin having 2 to 50 carbon atoms.)

In the molded article, molecular weight distribution of the vinyl group-containing compound may be in a range of 1.1 to 3.0.

In the molded article, the A may be a polymer chain constituted only of an α-olefin having 2 to 50 carbon atoms.

In the molded article, the A may be an ethylene homopolymer chain.

In the molded article, the vinyl group-containing compound may be an olefin-polyene copolymer (Z) satisfying the following (Z1) to (Z6).

(Z1) a copolymer which is obtained by copolymerizing ethylene with at least one kind of polyene, or a copolymer which is obtained by copolymerizing ethylene with at least one kind of olefin selected from α-olefins having 3 to 12 carbon atoms and at least one kind of polyene, (Z2) unsaturated groups per molecule is from 0.5 to 3.0, (Z3) a density is from 870 kg/m$^3$ to 980 kg/m$^3$, (Z4) a melting point is from 70° C. to 130° C., (Z5) a number average molecular weight (Mn) is from 400 to 5,000, (Z6) a ratio (Mw/Mn) of a weight average molecular weight (Mw) to a number average molecular weight (Mn) is equal to or less than 4.0.

In the molded article, the polyene of the (Z1) may be vinyl norbornene (5-vinylbicyclo[2.2.1]hept-2-ene).

In the molded article, a reaction rate of the double bond of the vinyl group-containing compound may be 90% or higher.

In the molded article, a melt mass-flow rate (MFR) of the silylated polyolefin that is measured at 190° C. under a load of 2.16 kg based on JIS K7210 may be 0.01 g/10 min or higher.

In the molded article, the thermoplastic resin may be at least one kind selected from a group consisting of a polyolefin resin, a polycarbonate resin, a thermoplastic polyester resin, a polyamide resin, a polyimide resin, a polyurethane resin, and a polylactic acid resin.

In the molded article, the thermosetting resin may be at least one kind selected from a group consisting of an epoxy resin and a thermally cross-linkable polyolefin resin.

The molded article may be a molded article obtained by performing melt molding on the composition.

The molded article may be in the form of a film or a sheet.

The molded article may be a molded article selected from an automobile interior part, a glass run channel, a plastic syringe, a packing material, a plastic container, a hollow fiber membrane, a gas-permeable film, and a gas-selective film.

In the molded article, the silicon-containing compound may have a structural unit represented by Formula (2'), and the vinyl group-containing compound may have a structure represented by Formula (4) and a molecular weight distribution that falls within a range of 1.1 to 3.0 (here, a case that uses a compound having 2 or more SiH groups per molecule as the silicon-containing compound and a compound having 2.0 or more vinyl groups on average per molecule as the vinyl group-containing compound, is excluded).

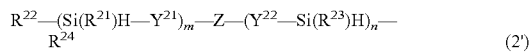

(2')

(In Formula (2'), each of $R^{21}$ and $R^{23}$ independently represents a hydrocarbon group, each of $R^{22}$ and $R^{24}$ independently represents a halogen atom or a hydrocarbon group, each of $Y^{21}$ and $Y^{22}$ independently represents O, S, or $NR^{30}$ ($R^{30}$ represents a hydrogen atom or a hydrocarbon group), m represents 1, n represents 1, when there are plural $R^{21}$s, $R^{23}$s, $Y^{21}$s, and $Y^{22}$s, the respective groups may be the same as or different from each other, Z represents a divalent group represented by Formula (3)

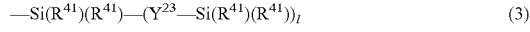

(3)

(In Formula (3), $R^{41}$ represents a hydrocarbon group, each $R^{41}$ may be the same as or different from each other, each $Y^{23}$ independently represents O, S, or $NR^{30}$ ($R^{30}$ represents a hydrogen atom or a hydrocarbon group), and l represents an integer of 0 to 10,000.)

(4)

(In Formula (4), A represents a polymer chain having a structure derived from an α-olefin having 2 to 50 carbon atoms.)

In the molded article, a reaction rate of the double bond of the vinyl group-containing compound may be 90% or higher.

The molded article may be formed of the composition by melt molding, wherein the silicon-containing compound may contain a structural unit represented by Formula (2e), and the vinyl group-containing compound may have a structure represented by Formula (4') and a number average molecular weight of equal to or more than 700 and equal to or less than 10,000 that is measured by GPC.

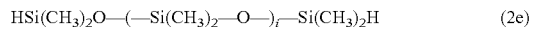

(2e)

(In Formula (2e), i represents an integer of equal to or more than 1 and equal to or less than 50.)

(4')

(In Formula (4'), A represents an ethylene homopolymer chain, and —CH═CH$_2$ presents only on the terminal of a main chain of the polymer.)

The molded article may be in the form of a film or a sheet, wherein the silicon-containing compound contains a structural unit represented by Formula (2e), and the vinyl group-containing compound has a structure represented by Formula (4') and a number average molecular weight of equal to or more than 700 and equal to or less than 10,000 that is measured by GPC.

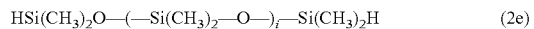

(2e)

(In Formula (2e), i represents an integer of equal to or more than 1 and equal to or less than 50.)

(4')

(In Formula (4'), A represents an ethylene homopolymer chain, and —CH═CH$_2$ presents only on the terminal of a main chain of the polymer.)

The molded article may be selected from an automobile interior part, a glass run channel, a plastic syringe, a packing material, a plastic container, a hollow fiber membrane, a gas-permeable film, and a gas-selective film, wherein the silicon-containing compound contains a structural unit represented by Formula (2e), and the vinyl group-containing compound has a structure represented by Formula (4') and a number average molecular weight of equal to or more than 700 and equal to or less than 10,000 that is measured by GPC.

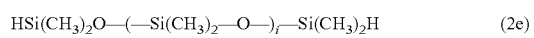

(2e)

(In Formula (2e), i represents an integer of equal to or more than 1 and equal to or less than 50.)

(4')

(In Formula (4'), A represents an ethylene homopolymer chain, and —CH═CH$_2$ presents only on the terminal of a main chain of the polymer.)

According to the present invention, it is possible to provide a molded article having excellent scratch resistance and soil resistance.

The object described above and other objects, characteristics, and advantages will be clarified further by preferable embodiments described below.

DESCRIPTION OF EMBODIMENTS

Hereinafter, preferable embodiments of the molded article of the present invention will be described in detail. In addition, unless otherwise specified, "to" indicates a range including a value before "to" to as a lower limit and a value after "to" as an upper limit.

The molded article of the present invention is formed of a composition comprising 100 parts by weight of at least one kind of resin selected from a group consisting of a thermoplastic resins and thermosetting resins, and 0.01 parts by weight to 10,000 parts by weight of a silylated polyolefin, which is obtained by a reaction between a silicon-containing compound containing a structural unit represented by Formula (1) and a vinyl group-containing compound having a number average molecular weight of equal to or more than 100 and equal to or less than 500,000 that is measured by GPC and containing a vinyl group (here, a case that uses a compound having 2 or more SiH groups per molecule as the silicon-containing compound and a compound having 2.0 or more vinyl groups on average per molecule as the vinyl group-containing compound, is excluded), a derivative thereof, or a mixture of these.

$$—Si(R^1)H—Y^1— \quad (1)$$

In Formula (1), $R^1$ represents a hydrogen atom, a halogen atom, or a hydrocarbon group, and $Y^1$ represents O, S, or $NR^{30}$ ($R^{30}$ represents a hydrogen atom or a hydrocarbon group).

It is considered that in the molded article, the structure of the silylated polyolefin may contain a —Si—C—C— structure which is generated by, for example, a reaction between —Si—H in the silicon-containing compound containing the structural unit of Formula (1) and —CH=CH$_2$ (vinyl group) of the vinyl group-containing compound, even though this is uncertain. Here, it is considered that a silylated polyolefin obtained in a case where a compound having 2 or more SiH groups per molecule is used as the silicon-containing compound, and a compound having 2.0 or more vinyl groups on average per molecule is used as the vinyl group-containing compound is highly likely to have, for example, a network structure. Accordingly, such a case is excluded from the present invention. The present inventors assume that since the present invention employs such a constitution, in the molded article formed of the composition comprising a resin and a silylated polyolefin, the silicon concentration of the surface may increase, and the surface free energy of the molded article may be suppressed. They also assume that for the above reason, the molded article may also have excellent scratch resistance and soil resistance such as water repellency and oil repellency.

(1) Thermoplastic Resin and Thermosetting Resin

Examples of the thermoplastic resin used in the present invention include a polyolefin resin, a polycarbonate resin, a thermoplastic polyester resin, an ABS resin, a polyacetal resin, a polyamide resin, a polyphenylene oxide resin, a polyimide resin, a polyurethane resin, a polylactic acid resin, a furan resin, and a silicone resin, but the present invention is not limited to these. In addition, examples of the thermosetting resin used in the present invention include an epoxy resin, a thermosetting unsaturated polyester resin, a phenol resin, and a thermosetting polyolefin resin, but the present invention is not limited to these. One kind of these thermoplastic resins and thermosetting resins may be used alone, or two or more kinds thereof can be used in combination.

The definition, preparation method, and the like of these thermoplastic resins and thermosetting resins are known well and disclosed in, for example, a publication such as "Dictionary of practical plastic" (edited by Editorial committee of dictionary of practical plastic, published from Industrial Research Center of Japan, Production Goods Work Station). Moreover, a "resin" referred herein is not particularly limited and may be any of soft and hard resins.

The above respective thermoplastic resins will be described in detail.

(Ia) Polyolefin Resin

The polyolefin resin used in the present invention is not particularly limited, and polyolefin resins known in the related art can be used. Specific examples thereof include a polyethylene resin such as low-density polyethylene or high-density polyethylene, a polypropylene resin, a polyethylene terephthalate resin, a polyvinyl chloride resin, (chlorinated polyolefin), an ethylene-vinyl acetate copolymer, an ethylene-methacrylic acid-acrylate copolymer, and the like. Among these, low-density polyethylene, high-density polyethylene, and a polypropylene resin are preferably used.

(Ib) Polycarbonate Resin

The polycarbonate resin used in the present invention is typically a resin obtained by reacting aromatic diol (for example, bisphenol A) with phosgene.

Such a polycarbonate resin is commercially available, and examples thereof include products having trade names of NOVAREX (registered trademark) (manufactured by Mitsubishi Chemical Corporation), Panlite (registered trademark) (manufactured by TEIJIN CHEMICALS LTD.), Lexan (registered trademark) (manufactured by GE Plastics Japan, Ltd.), and the like. These can be preferably used in the present invention.

(Ic) Thermoplastic Polyester Resin

The thermoplastic polyester resin used in the present invention is typically a resin obtained by polycondensation of dicarboxylic acid and diol. In the present invention, polyethylene terephthalate, polybutylene terephthalate, polyethylene-2,6-naphthalenedicarboxylate, polycyclohexane terephthalate, and the like are preferably used.

(Id) ABS Resin

The ABS resin used in the present invention is typically an impact-resistant resin obtained by graft polymerization of polybutadiene with acrylonitrile and styrene. In the present invention, an ABS resin in which the amount of a polybutadiene component is 5% by weight to 40% by weight, and a weight ratio (styrene/acrylonitrile) between a styrene component and an acrylonitrile component is 70/30 to 80/20 is preferable.

(Ie) Polyacetal Resin

The polyacetal resin used in the present invention is typically a resin obtained by performing ring-opening polymerization of formalin or trioxane and optionally ethylene oxide if desired, in the presence of a cation catalyst. It is a resin having a polyoxymethylene chain as a main structure. In the present invention, a copolymer type polyacetal resin is preferable.

(If) Polyamide Resin

The polyamide resin used in the present invention is typically a resin obtained by polycondensation of diamine and dicarboxylic acid, ring-opening polymerization of caprolactam, or the like. In the present invention, a product of a polycondensation reaction between aliphatic diamine and aliphatic or aromatic dicarboxylic acid is preferable.

(Ig) Polyphenylene Oxide Resin

The polyphenylene oxide resin used in the present invention is typically obtained by oxidative coupling of 2,6-dimethylphenol in the presence of a copper catalyst. In addition, a modified polyphenylene oxide resin obtained by modifying the resin can also be used in the present invention.

In the present invention, a modified blend of the polyphenylene oxide resin and a styrene-based polymer is preferable.

(Ih) Polyimide Resin

The polyimide resin used in the present invention is typically a resin obtained by polycondensation of tetracarboxylic acid and diamine to form an imide bond in the main structure.

(Ii) Polyurethane Resin

The polyurethane resin used in the present invention is preferably a resin obtained by using isocyanate such as tolylene diisocyanate, diphenylmethane diisocyanate, or hexamethylene diisocyanate and polyol such as polyether polyol, polyester polyol, polycarbonate polyol, or polycaprolactone polyol as main materials and mixing and reacting both the materials with each other.

(Ij) Polylactic Acid Resin

The polylactic acid resin used in the present invention is preferably a resin obtained when lactic acid is polymerized by an ester bond. For example, lactic acid is heated under reduced pressure in a solvent such as diphenyl ether and polymerized while water is being removed, whereby polylactic acid is obtained.

(Ik) Furan Resin

Examples of the furan resin used in the present invention include resins obtained by polycondensation of a mixture containing furfuryl alcohol as a main component. Examples of such resins include resins obtained by polycondensation of furfuryl alcohol, urea, and aldehydes. As the aldehydes, aldehyde compounds known in the related art, such as formaldehyde, glyoxal, and furfural can be used.

(Il) Silicone Resin

Examples of the silicone resin used in the present invention include polymers and the like obtained by hydrolysis of various silanes including dialkyldichlorosilane and dehydration condensation on the generated silanol. Examples of such polymers include a polymer obtained by a chlorosilane method in which dimethyldichlorosilane, methyltrichlorosilane, or tetrachlorosilane is hydrolyzed and subjected to dehydration condensation, and a polymer obtained by a sol-gel method in which dimethyldimethoxysilane, trimethoxysilane, or tetramethoxysilane is hydrolyzed and subjected to dehydration condensation.

The above respective thermosetting resins will be described in detail. In addition, the following description relates to a state where the respective resins have not undergone thermosetting.

(Im) Epoxy Resin

The epoxy resin used in the present invention is typically a resin obtained by reacting aromatic diol (for example, bisphenol A) with epichlorohydrin, in the presence of alkali. In the present invention, a bisphenol A type epoxy resin having an epoxy equivalent weight of 170 to 5,000, a bisphenol F type epoxy resin, and a bisphenol S type epoxy resin are preferable.

(In) Thermosetting Unsaturated Polyester Resin

The thermosetting unsaturated polyester resin used in the present invention is typically a resin obtained by causing an esterification reaction between aliphatic unsaturated dicarboxylic acid and aliphatic diol. In the present invention, a resin which is obtained by causing an esterification reaction between unsaturated dicarboxylic acid such as maleic acid or fumaric acid and diol such as ethylene glycol or diethylene glycol is preferable.

(Io) Phenol Resin

The phenol resin used in the present invention includes any of novolac-type and resol-type phenol resins. In the present invention, a novolac-type phenol resin hardened by hexamethylenetetramine or solid resol having a dimethylene ether bond as a main structure is preferable.

(Ip) Thermosetting Polyolefin Resin

The thermosetting polyolefin used in the present invention is not particularly limited, and examples thereof include DCPD (dicyclopentadiene), a polybutadiene resin, and the like. Such resins are commercially available, and examples of the DCPD resin include a resin selected from products having trade names "PENTAM (registered trademark)" and "METTON (registered trademark)" (manufactured by RIMTEC Corporation).

When the resin is a thermoplastic resin among the above, the resin is preferably at least one or more kinds selected from a group consisting of a polyolefin resin, a polycarbonate resin, a thermoplastic polyester resin, a polyamide resin, a polyimide resin, a polyurethane resin, and a polylactic acid resin. When the resin is a thermosetting resin, the resin is preferably at least one or more kinds selected from a group consisting of an epoxy resin and a thermosetting polyolefin resin. The thermoplastic resin is more preferably a polyolefin resin, and particularly preferably at least one or more kinds selected from a polypropylene resin and a polyethylene resin.

In the present invention, the thermoplastic resin or thermosetting resin can be used without particular limitation, as long as the molecular weight thereof is in such a degree that can form a molded article and regarded as being suitable in various molded articles. Examples thereof include resins having a MFR of 0.01 g/10 min to 200 g/10 min and preferably 0.01 g/10 min to 100 g/10 min that is measured by the method disclosed in JIS K7210. The measurement conditions vary with the type of the resin, and conditions described in Table 1 of appendix B can be used. For example, when the resin is a polyolefin resin such as a polyethylene resin (low-density polyethylene, high-density polyethylene, or the like) or a polybutene resin, MRF is measured at 190° C. under a load of 2.16 kg. When the resin is a polypropylene resin, MFR is measured at 230° C. under a load of 2.16 kg. When the resin is an ethylene-vinyl acetate copolymer, MFR is measured at 190° C. under a load of 2.16 kg.

The silicon-containing compound used in the present invention is a hydrosilane compound having a structural unit represented by Formula (1).

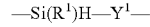

$$—Si(R^1)H—Y^1— \quad (1)$$

In Formula (1), $R^1$ represents a hydrogen atom, a halogen atom, or a hydrocarbon group, and $Y^1$ represents O, S, or $NR^{30}$ ($R^{30}$ represents a hydrogen atom or a hydrocarbon group).

Examples of the halogen atom include fluorine, chlorine, bromine, and iodine.

Examples of the hydrocarbon group include an alkyl group, an alkenyl group, and an aryl group.

Examples of the alkyl group include linear or branched alkyl group such as a methyl group, an ethyl group, an n-propyl group, an isopropyl group, an n-butyl group, an isobutyl group, a tert-butyl group, a hexyl group, a 2-ethylhexyl group, an octyl group, a decyl group, or an octadecyl group; a cycloalkyl group such as a cyclopentyl group, a cyclohexyl group, or a norbornyl group; and an arylalkyl group such as a benzyl group, a phenylethyl group, or a phenylpropyl group.

Examples of the alkenyl group include a vinyl group, a propenyl group, a cyclohexenyl group, and the like.

Examples of the aryl group include a phenyl group, a tolyl group, a dimethylphenyl group, a trimethylphenyl group, an ethylphenyl group, a propylphenyl group, a biphenyl group, a naphthyl group, a methylnaphthyl group, an anthryl group, a phenanthryl group, and the like.

The above hydrocarbon group may have one or more hetero atoms. Specific examples of the hydrocarbon group include groups obtained by substituting at least one hydrogen atom of the hydrocarbon groups with a group having a halogen atom, oxygen, nitrogen, silicon, phosphorus, or sulfur.

In an embodiment, the silicon-containing compound has a structure represented by Formula (2).

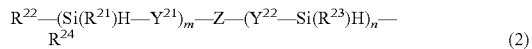
(2)

In Formula (2), each of $R^{21}$ and $R^{23}$ independently represents a hydrogen atom, a halogen atom, or a hydrocarbon group, each of $R^{22}$ and $R^{24}$ independently represents a halogen atom or a hydrocarbon group, each of $Y^{21}$ and $Y^{22}$ independently represents O, S, or $NR^{30}$ ($R^{30}$ represents a hydrogen atom or a hydrocarbon group), m represents 0 or 1, n represents 0 or 1, when there are plural $R^{21}$s, $R^{23}$s, $Y^{21}$s and $Y^{22}$s, the respective groups may be the same as or different from each other, Z represents a divalent group represented by Formula (3):

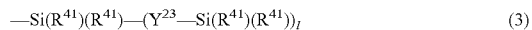
(3)

In Formula (3), $R^{41}$ represents a hydrogen atom, a halogen atom, or a hydrocarbon group, each $R^{41}$ may be the same as or different from each other, each $Y^{23}$ independently represents O, S, or $NR^{30}$ ($R^{30}$ represents a hydrogen atom or a hydrocarbon group), and l represents an integer of 0 to 10,000.

Here, when m=n=0 in the Formula (2), at least one $R^{41}$ represents a hydrogen atom in Formula (3).

The halogen atom and hydrocarbon group in Formulae (2) and (3) have the same definition as described in the Formula (1).

In addition, in a typical embodiment, the hydrocarbon group in Formulae (1), (2), and (3) includes only a carbon atom and a hydrogen atom.

In an embodiment, the silicon-containing compound preferably has 3 or more silicon atoms, more preferably has 5 or more silicon atoms, and even more preferably has 10 or more silicon atoms. Moreover, the silicon-containing compound preferably has equal to or less than 10,000 silicon atoms, more preferably has equal to or less than 1,000 silicon atoms, particularly preferably has equal to or less than 300 silicon atoms, and even more preferably has equal to or less than 50 silicon atoms. If a silylated polyolefin using such a silicon-containing compound is used, the obtained molded article exhibits excellent scratch resistance and soil resistance. In addition, the scratch resistance described herein includes abrasion resistance, friction resistance, and slidability.

In an embodiment, 1 in the Formula (3) represents an integer of 0 to 10,000. Examples of preferable upper and lower limits thereof include numbers determined by the value of m and n in Formula (2) and the above preferable number of silicon atoms.

In an embodiment, a silicon-containing compound represented by the Formula (2) in which m=n=1, that is, a silicon-containing compound having a SiH group on both terminals is preferably used.

In an embodiment, a silicon-containing compound represented by Formula (2) in which m=1 and n=0, that is, a silicon-containing compound having a SiH group on one terminal is preferably used.

Examples of particularly preferable silicon-containing compounds include compounds represented by the Formulae (2) and (3) in which m=n=1, and all of $R^{21}$, $R^{23}$, and $R^{41}$ are hydrocarbon groups. Examples of other particularly preferable silicon-containing compounds include compounds represented by the Formulae (2) and (3) in which m=1, n=0, and all of $R^{21}$ and $R^{41}$ are hydrocarbon groups.

Specific examples of the silicon-containing compound used in the present invention will be shown below. Examples of the silicon-containing compound of the present invention include a compound having one SiH group.

Examples of the silicon-containing compound having one SiH group include a compound represented by Formula (2a), a compound obtained by substituting a portion or all of methyl groups in Formula (2a) with an ethyl group, a propyl group, a phenyl group, or a trifluoropropyl group, and the like.

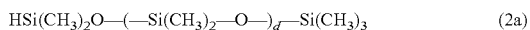
(2a)

(In Formula (2a), d represents an integer of 1 or greater, and the upper limit thereof is, for example, 1,000, preferably 300, and particularly preferably 50.)

More specific examples of such compounds include the following compounds, but the present invention is not limited thereto.

Other examples of the silicon-containing compound having one SiH group include a dimethylsiloxane-methyl hydrogen siloxane copolymer represented by Formula (2b), a compound obtained by substituting a portion or all of methyl groups in Formula (2b) with an ethyl group, a propyl group, a phenyl group, or a trifluoropropyl group, and the like.

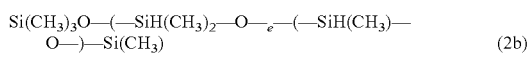
(2b)

(In Formula (2b), e represents an integer of 0 or greater, and the upper limit thereof is, for example, 1,000, preferably 300, and more preferably 50.)

The unit of —Si(CH$_3$)$_2$—O— and the unit of —SiH(CH$_3$)—O— may line up in any order without particular limitation. The units may form a block, line up randomly, or line up in an order that is statistically random.

More specific examples of such a compound include the compound shown below, but the present invention is not limited thereto.

Examples of the silicon-containing compound of the present invention also include a compound having 2 or more SiH groups.

Examples of the silicon-containing compound having 2 or more SiH groups include methyl hydrogen polysiloxane represented by Formula (2c), a compound obtained by substituting a portion or all of methyl groups in Formula (2c) with an ethyl group, a propyl group, a phenyl group, or a trichloropropyl group, and the like.

$$(CH_3)_3SiO—(—SiH(CH_3)—O—)_f—Si(CH_3)_3 \quad (2c)$$

(In Formula (2c), f represents an integer of 2 or greater, and the upper limit thereof is, for example 1,000, preferably 300, and more preferably 50.)

Other examples of the silicon-containing compound having 2 or more SiH groups include a dimethylsiloxane-methyl hydrogen siloxane copolymer represented by Formula (2d), a compound formed when a portion or all of methyl groups in Formula (2d) are substituted with an ethyl group, a propyl group, a phenyl group, or a trichloropropyl group, and the like.

$$(CH_3)_3SiO—(—Si(CH_3)_2—O—)_g—(SiH(CH_3)—O—)_h—Si(CH_3)_3 \quad (2d)$$

(In Formula (2d), g represents an integer of 1 or greater, h represents an integer of 2 or greater, and the upper limit of the sum of g and h is, for example, 1,000, preferably 300, and more preferably 50.)

In Formula (2d), the unit of $—Si(CH_3)_2—O—$ and the unit of $SiH(CH_3)—O—$ may line up in any order without particular limitation. The units may form a block, line up randomly, or line up in an order that is statistically random.

More specific examples of such a compound include a compound shown below, but the present invention is not limited to thereto.

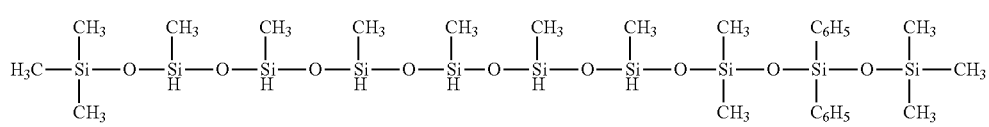

[Chem. 1]

Other examples of the silicon-containing compound having 2 or more SiH groups further include methyl hydrogen polysiloxane represented by Formula (2e), a compound obtained by substituting a portion or all of methyl groups in Formula (2e) with an ethyl group, a propyl group, a phenyl group, or a trichloropropyl group, and the like.

$$HSi(CH_3)_2O—(—Si(CH_3)_2—O—)_i—Si(CH_3)_2H \quad (2e)$$

(In Formula (2e), i represents an integer of 1 or greater, and the upper limit thereof is, for example, 1,000, preferably 300, and more preferably 50.)

More specific examples of such a compound include compounds shown below, but the present invention is not limited thereto.

$$HSi(CH_3)_2O—(—Si(CH_3)_2—O—)_5—Si(CH_3)_2H$$

$$HSi(CH_3)_2O—(—Si(CH_3)_2—O—)_8—Si(CH_3)_2H$$

$$HSi(CH_3)_2O—(—Si(CH_3)_2—O—)_{18}—Si(CH_3)_2H$$

$$HSi(CH_3)_2O—(—Si(CH_3)_2—O—)_{80}—Si(CH_3)_2H$$

$$HSi(CH_3)_2O—(—Si(CH_3)_2—O—)_{230}—Si(CH_3)_2H$$

Other examples of the silicon-containing compound having 2 or more SiH groups further include methyl hydrogen polysiloxane represented by Formula (2f), a compound obtained by substituting a portion or all of methyl groups in Formula (2f) with an ethyl group, a propyl group, a phenyl group, or a trichloropropyl group, and the like.

$$HSi(CH_3)_2O—(—SiH(CH_3)—O—)_j—Si(CH_3)_2H \quad (2f)$$

(In Formula (2f), j represents an integer of 1 or greater, and the upper limit thereof is, for example 1,000, preferably 300, and more preferably 50.)

Other examples of the silicon-containing compound having 2 or more SiH groups further include a dimethylsiloxane-methyl hydrogen siloxane copolymer represented by Formula (2g), a compound obtained by substituting a portion or all of methyl groups in Formula (2g) with an ethyl group, a propyl group, a phenyl group, or a trichloropropyl group, and the like.

$$HSi(CH_3)_2O—(—Si(CH_3)_2—O—)_k—(—SiH(CH_3)—O—)_l—Si(CH_3)_2H \quad (2g)$$

(In Formula (2g), k and l represent an integer of 1 or greater respectively, and the upper limit of the sum of k and l is, for example, 1,000, preferably 300, and more preferably 50.)

The unit of $—Si(CH_3)_2—O—$ and the unit of $—SiH(CH_3)—O—$ may line up in any order without particular limitation. The units may form a block, line up randomly, or line up in an order that is statistically random.

The number average molecular weight of the vinyl group-containing compound of the present invention that is measured by GPC is preferably equal to or more than 100 and equal to or less than 500,000, and more preferably equal to or more than 100 and equal to or less than 100,000. When the number average molecular weight is smaller than the above lower limit, the obtained silylated polyolefin bleeds from a resin in some cases. When the number average molecular weight is larger than the above upper limit, dispersibility of the silylated polyolefin in a resin deteriorates, and this makes it difficult to handle the obtained molded article in some cases. In the present invention, the values of the number average molecular weight (Mn), weight average molecular weight (Mw), and Mw/Mn are expressed in terms of polyethylene.

Hereinafter, the vinyl group-containing compound will be described.

The vinyl group-containing compound is obtained by polymerizing or copolymerizing one or more kinds selected from olefins having 2 to 50 carbon atoms in general.

Specific examples of the olefin having 2 to 50 carbon atoms include α-olefins such as ethylene, propylene, 1-butene, 1-pentene, 3-methyl-1-butene, 1-hexene, 4-methyl-1-pentene, 3-methyl-1-pentene, 3,4-dimethyl-1-pentene, 4-methyl-1-hexene, 3-ethyl-1-pentene, 3-ethyl-4-methyl-1-pentene, 3,4-dimethyl-1-hexene, 4-methyl-1-heptene, 3,4-dimethyl-1-heptene, 1-octene, 1-decene, 1-dodecene, 1-tetradecene, 1-hexadecene, 1-octadecene, 1-eicocene, and vinyl cyclohexane; olefins having a double bond inside thereof, such as cis-2-butene and trans-2-butene; vinylidene compounds such as isobutene, 2-methyl-1-pentene, 2,4-dimethyl-1-pentene, 2,4-dimethyl-1-hexene, 2,4,4-trimethyl-1-pentene, 2,4-dimethyl-1-heptene, 2-methyl-1-butene, 2-methyl-1-hexene, 2-methyl-1-heptene, 2-methyl-1-octene, 2,3-dimethyl-1-butene, 2,3-dimethyl-1-pentene, 2,3-dimethyl-1-hexene, 2,3-dimethyl-1-octene, 2,3,3-trimethyl-1-butene, 2,3,3-trimethyl-1-pentene, 2,3,3-trimethyl-1-hexene, 2,3,3-trimethyl-1-octene, 2,3,4-trimethyl-1-pentene, 2,3,4-trimethyl-1-hexene, 2,3,4-trimethyl-1-octene, 2,4,4-trimethyl-1-hexene, 2,4,4-trimethyl-1-octene, 2-methyl-3-cyclohexyl-1-propylene, vinylidene cyclopentane, vinylidene cyclohexane, vinylidene cyclooctane, 2-methylvinylidene cyclopentane, 3-methylvinylidene cyclopentane, and 4-methylvinylidene cyclopentane; aryl vinyl compounds such as styrene, o-methylstyrene, m-methylstyrene, p-methylstyrene, 2,4-dimethylstyrene, o-ethylstyrene, m-ethylstyrene, and p-ethylstyrene; aryl vinylidene compounds such as α-methylstyrene, α-ethylstyrene, and 2-methyl-3-phenylpropylene; functional group-substituted vinylidene compounds such as methyl methacrylate, ethyl methacrylate, n-propyl methacrylate, isopropyl methacrylate, n-butyl methacrylate, isobutyl methacrylate, tert-butyl methacrylate, 2-cyanopropylene, 2-aminopropylene, 2-hydroxymethylpropylene, 2-fluoropropylene, and 2-chloropropylene; aliphatic cyclic olefins having a double bond inside thereof, such as cyclobutene, cyclopentene, 1-methyl-1-cyclopentene, 3-methyl-1-cyclopentene, 2-methyl-1-cyclopentene, cyclohexene, 1-methyl-1-cyclohexene, 3-methyl-1-cyclohexene, 2-methyl-1-cyclohexene, cycloheptene, cyclooctene, norbornene, 5-methyl-2-norbornene, tetraclododecene, 5,6-dihydrodicyclopentadiene, 3a,4,5,6,7,7a-hexahydro-1H indene, tricyclo[6.2.1.0$^{2,7}$]undeca-4-ene, cyclopentadiene, and dicyclopentadiene; aromatic ring-containing cyclic olefins such as cyclopent-2-enyl benzene, cyclopent-3-enyl benzene, cyclohex-2-enyl benzene, cyclohex-3-enyl benzene, indene, 1,2-dihydronaphthalene, 1,4-dihydronaphthalene, and 1,4-methino-1,4,4a,9a-tetrahydrofluorene; cyclic polyenes and chain-like polyenes having two or more double bonds, such as butadiene, isoprene, 4-methyl-1,3-pentadiene, 4-methyl-1,4-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene, dicyclopentadiene, 7-methyl-1,6-octadiene, 4-ethylidene-8-methyl-1,7-nonadiene and 5,9-dimethyl-1,4,8-decatriene, and the like.

The olefin having 2 to 50 carbon atoms may have a functional group including atoms of oxygen, nitrogen, sulfur, and the like. Examples thereof include unsaturated carboxylic acid such as acrylic acid, fumaric acid, itaconic acid, and bicyclo[2.2.1]hepta-5-ene-2,3-dicarboxylic acid, and unsaturated metal carboxylates such as a sodium salt, a potassium salt, a lithium salt, a zinc salt, a magnesium salt, a calcium salt of these unsaturated carboxylic acids; unsaturated carboxylic acid anhydrides such as maleic anhydride, itaconic anhydride, and bicyclo[2.2.1]hepta-5-ene-2,3-dicarboxylic acid anhydride; unsaturated carboxylic acid esters such as methyl acrylate, ethyl acrylate, n-propyl acrylate, isopropyl acrylate, n-butyl acrylate, isobutyl acrylate, tert-butyl acrylate, and 2-ethylhexyl acrylate; vinyl esters such as vinyl acetate, vinyl propionate, vinyl caproate, vinyl caprate, vinyl laurate, vinyl stearate, and vinyl trifluoroacetate; unsaturated glycidyl esters such as glycidyl acrylate, glycidyl methacrylate, and itaconic acid monoglycidyl ester; halogenated olefins such as vinyl chloride, vinyl fluoride, and allyl fluoride; unsaturated cyano compounds such as acrylonitrile and 2-cyano-bicyclo[2.2.1]hepta-5-ene; unsaturated ether compounds such as methyl vinyl ether and ethyl vinyl ether; unsaturated amides such as acrylamide, methacrylamide, and N,N-dimethylacrylamide; functional group-containing styrene derivatives such as methoxy styrene, ethoxy styrene, vinyl benzoic acid, methyl vinyl benzoate, vinyl benzyl acetate, hydroxystyrene, o-chlorostyrene, p-chlorostyrene, and divinyl benzene; N-vinylpyrrolidone, and the like.

In a preferable embodiment, the vinyl group-containing compound is a compound having a structure represented by Formula (4) and a number average molecular weight of equal to or more than 100 and equal to or less than 500,000.

$$A\text{-}CH{=}CH_2 \qquad (4)$$

In Formula (4), A represents a polymer chain having a structural unit derived from one or more kinds of α-olefins having 2 to 50 carbon atoms.

In Formula (4), the portion A of the vinyl group-containing compound is preferably an ethylene polymer chain, a propylene polymer chain, or a copolymer chain of 2 or more kinds of olefins selected from a group consisting of α-olefins having 2 to 50 carbon atoms. In addition, the α-olefins are preferably α-olefins having 2 to 20 carbon atoms.

In a preferable embodiment, A of the vinyl group-containing compound represented by Formula (4) is a polymer chain constituted only of an α-olefin having 2 to 50 carbon atoms. More preferably, A of the vinyl group-containing compound is preferably a polymer chain constituted only of an α-olefin having 2 to 20 carbon atoms. Even more preferably, A of the vinyl group-containing compound is an ethylene homopolymer chain, a propylene homopolymer chain, or a copolymer chain of ethylene and α-olefin having 3 to 20 carbon atoms.

The vinyl group-containing compound represented by Formula (4) is desirably an ethylene-α-olefin copolymer in which the amount of the structural unit derived from ethylene ranges from 81 mol % to 100 mol %, and the amount of the structural unit derived from an α-olefin having 3 to 20 carbon atoms ranges from 0 mol % to 19 mol %. More desirably, the vinyl group-containing compound is an ethylene-α-olefin copolymer in which the amount of the structural unit derived from ethylene ranges from 90 mol % to 100 mol %, and the amount of the structural unit derived from an α-olefin having 3 to 20 carbon atoms ranges from 0 mol % to 10 mol %. The amount of the structural unit derived from ethylene is particularly preferably 100 mol %.

The molecular weight distribution (ratio of weight average molecular weight to number average molecular weight, Mw/Mn), which is measured by gel permeation chromatography (GPC), of the vinyl group-containing compound represented by Formula (4) is preferably in a range of 1.1 to 3.0.

The number average molecular weight (Mn) of the vinyl group-containing compound represented by Formula (4) is desirably in a range of 100 to 500,000, more preferably equal to or more than 500 and equal to or less than 50,000, and even more preferably equal to or more than 700 and equal to or less than 10,000.

The melting point of the vinyl group-containing compound represented by Formula (4) is preferably equal to or higher than 70° C. and equal to or lower than 130° C.

The vinyl group of the vinyl group-containing compound represented by Formula (4) is more preferably present on the terminal of a main chain. Even more preferably, the vinyl group is present only on the terminal of a main chain.

Whether the vinyl group is present on the terminal of a main chain can be confirmed by using, for example, $^{13}$C-NMR or $^1$H-NMR. When A is an ethylene homopolymer, examples of methods for confirming such a state include a method in which tertiary carbon is not detected in $^{13}$C-NMR, and hydrogen of the vinyl group is detected by $^1$H-NMR. Even in a case of using only $^1$H-NMR, if the detected peaks of respective protons are attributed to each group, the structure can be confirmed. For example, in the compound synthesized in Synthesis example 1, a peak of chemical shift of 0.81 ppm where an integral value of proton is 3 is attributed to a methyl group of one terminal, a peak of chemical shift of 1.10 ppm to 1.45 ppm is attributed to a methylene group of a main chain, a peak of chemical shift of 1.93 ppm where an integral value of proton is 2 is attributed to a methylene group adjacent to a terminal vinyl group, peaks of 4.80 ppm, 4.86 ppm, and 5.60 ppm to 5.72 ppm where an integral value is 1 are attributed to a terminal vinyl group. In this compound, other peaks of which the attribution is unclear are not observed. Accordingly, it is possible to confirm that A is an ethylene homopolymer and has a structure containing a vinyl group only on the terminal. In addition, as another method, it is also possible to use a method of utilizing a fact that the relaxation time in $^1$H-NMR measurement is shorter for hydrogen of a vinyl group present on the terminal of a main chain than for hydrogen of a vinyl group present in a side chain, and a method of comparing the relaxation time of, for example, hydrogen of a vinyl group of a polymer which has the vinyl group in a side chain with the relaxation time of the compound, so as to determine the structure of the compound.

Sometimes, it is also possible to determine the structure by utilizing a fact that in $^1$H-NMR, the chemical shift of a vinyl group of a side chain is caused in a lower magnetic field, compared to a vinyl group present on the terminal.

Moreover, when the vinyl group-containing compound represented by Formula (4) contains a vinyl group only on the terminal of a main chain, an unsaturated rate of a terminal (VE described later) calculated by $^1$H-NMR is desirably equal to or higher than 60 mol % and equal to or lower than 100 mol %. In a more preferable embodiment, an unsaturated rate of a terminal calculated by $^1$H-NMR is equal to or higher than 80 mol % and equal to or lower than 99.5 mol %, and more preferably equal to or higher than 90 mol % and equal to or lower than 99 mol %.

The vinyl group-containing compound represented by Formula (4) of the present invention can be obtained by, for example, polymerizing or copolymerizing one or more kinds selected from olefins having 2 to 50 carbon atoms by using a catalyst (B) comprising a transition metal compound (A) represented by the following Formula (I), (II), or (III) and at least one kind of compound selected from (B-1) an organic metal compound, (B-2) an organic aluminum oxy compound, and (B-3) a compound forming an ion pair by reacting with the transition metal compound (A).

Transition metal compound represented by Formula (I)

[Chem. 2]

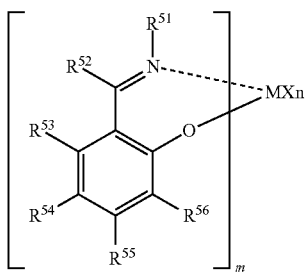

(In Formula (I), M represents a transition metal atom of groups 4 to 5 on the periodic table. m represents an integer of 1 to 4. $R^{51}$ represents a linear hydrocarbon group having 1 to 5 carbon atoms ($C_{n'}H_{2n'+1}$, n'=1 to 5) or a hydrogen atom. $R^{52}$ to $R^{56}$ may be the same as or different from each other, and represent a hydrogen atom, a halogen atom, a hydrocarbon group, a residue of heterocyclic compound, an oxygen-containing group, a nitrogen-containing group, a boron-containing group, a sulfur-containing group, a phosphorus-containing group, a silicon-containing group, a germanium-containing group, or a tin-containing group. Among these, 2 or more groups may be linked to each other to form a ling. When m is 2 or greater, 2 groups among the groups represented by $R^{52}$ to $R^{56}$ may be linked to each other. n represents a number satisfying the valency of M, and X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a residue of a heterocyclic compound, a silicon-containing group, a germanium-containing group, or a tin-containing group. When n is two or greater, plural groups represented by X may be the same as or different from each other. Moreover, plural groups represented by X may bind to each other to form a ring.)

Transition metal compound represented by Formula (II)

[Chem. 3]

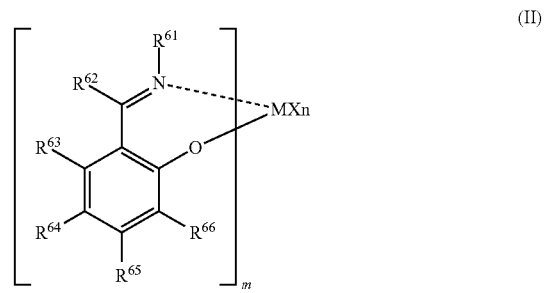

(In Formula (II), M represents a transition metal atom of groups 4 to 5 on the periodic table. m represents an integer of 1 to 4. $R^{61}$ represents a 3- to 5-membered alicyclic hydrocarbon group which may have one or plural substituents. $R^{62}$ to $R^{66}$ may be the same as or different from each other, and represent a hydrogen atom, a halogen atom, a hydrocarbon group, a residue of a heterocyclic compound, an oxygen-containing group, a nitrogen-containing group, a boron-containing group, a sulfur-containing group, a phosphorus-containing group, a silicon-containing group, a germanium-containing group, or a tin-containing group. Among these, 2 or more groups may be linked to each other to form a ring. When m is 2 or greater, 2 groups among groups represented by $R^{62}$ to $R^{66}$ may be linked to each other. n represents a number satisfying the valency of M, and X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a residue of a heterocyclic compound, a silicon-containing group, a germanium-containing group, or a tin-containing group. When n is 2 or greater, plural groups represented by X may be the same as or different from each other. Moreover, plural groups represented by X may bind to each other to form a ring.)

Transition metal compound represented by Formula (III)

[Chem. 4]

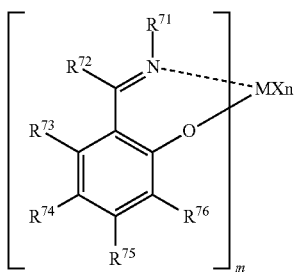

(In Formula (III), M represents a transition metal atom of groups 4 to 5 on the periodic table. m represents an integer of 1 to 4. $R^{71}$ represents a bicyclic hydrocarbon group sharing 1 or more carbon atoms that may have 1 or plural substituents and has 4 to 20 carbon atoms. $R^{72}$ to $R^{76}$ may be the same as or different from each other, and represent a hydrogen atom, a halogen atom, a hydrocarbon group, a residue of a heterocyclic compound, an oxygen-containing group, a nitrogen-containing group, a boron-containing group, a sulfur-containing group, a phosphorus-containing group, a silicon-containing group, a germanium-containing group, or a tin-containing group. Among these, 2 or more groups may be linked to each other to form a ring. When m is 2 or greater, 2 groups among the groups represented by $R^{72}$ to $R^{76}$ may be linked to each other. n represents a number satisfying the valency of M, and X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a residue of a heterocyclic compound, a silicon-containing group, a germanium-containing group, or a tin-containing group. When n is 2 or greater, plural groups represented by X may be the same as or different from each other. Moreover, plural groups represented by X may bind to each other to form a ring.)

When A includes only the structural unit derived from ethylene, and when A includes only the structural unit derived from propylene, A can also be prepared by the following methods.

(Polyolefin Having an Ethylene Homopolymer Chain)

A (E1) polyolefin polymer chain having an ethylene homopolymer chain can also be prepared by, for example, the following method.

(a) a polymerization method in which a transition metal compound having a salicylaldimine ligand described in Japanese Unexamined Patent Publication Nos. 2000-239312, 2001-2731, and 2003-73412 is used as a polymerization catalyst (b) a polymerization method using a titanium-based catalyst including a titanium compound and an organic aluminum compound (c) a polymerization method using a vanadium-based catalyst including a vanadium compound and an organic aluminum compound (d) a polymerization method using Ziegler catalyst including a metallocene compound such as zirconocene and an organic aluminum oxy compound (aluminoxane)

(Polyolefin Having a Propylene Homopolymer Chain)

A (E2) polyolefin polymer chain having a propylene homopolymer chain can also be prepared by, for example, the following methods.

(a) a method of polymerizing propylene in the presence of a support-type titanium-based catalyst, for example, a magnesium-supported titanium-based catalyst or a metallocene catalyst described in Japanese Unexamined Patent Publication No. 2004-262993

(b) a method of polymerizing propylene in the presence of a metallocene-based catalyst including a compound which forms an ionic complex by reacting with a transition metal in a metal compound, an organic aluminum compound, and aluminoxane described in Japanese Unexamined Patent Publication Nos. 2000-191862, 2002-097325, and the like (Olefin-Polyene Copolymer)

A (Z) olefin-polyene copolymer which is one of the vinyl group-containing compounds of the present application will be described.

Examples of the olefin include ethylene and α-olefins having 3 to 12 carbon atoms.

Examples of the α-olefin having 3 to 12 carbon atoms include propylene, 1-butene, 1-pentene, 3-methyl-1-butene, 1-hexene, 4-methyl-1-pentene, 3-methyl-1-pentene, 1-octene, 1-decene, 1-dodecene, and the like. Among these, α-olefins having 3 to 10 carbon atoms are preferable, α-olefins having 3 to 8 carbon atoms are more preferable, and propylene, 1-butene, 1-hexene, and 4-methyl-1-pentene are particularly preferable.

Examples of the polyene include butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene (5-vinyl bicyclo [2.2.1]hept-2-ene), dicyclopentadiene, 2-methyl-1,4-hexadiene, 2-methyl-1,6-octadiene, 7-methyl-1,6-octadiene, 4-ethylidene-8-methyl-1,7-nonadiene, 5,9-dimethyl-1,4,8-decatriene, and the like. Among these, vinyl norbornene, ethylidene norbornene, dicyclopentadiene, 1,4-hexadiene, butadiene, isoprene, 2-methyl-1,4-hexadiene, or 2-methyl-1,6-octadiene is preferable. Having a bulky structure, vinyl norbornene can harden wax even at a low density and does not easily cause blocking of wax products. Accordingly, vinyl norbornene is particularly preferable.

(i) An olefin-polyene copolymer is preferably the following copolymer (Z1). That is, (Z1) is at least one or more kinds selected from the ethylene-polyene copolymer described above and a copolymer of ethylene, at least one kind of α-olefin selected from α-olefins having 3 to 12 carbon atoms, and a polyene.

The (Z) olefin-polyene copolymer used in the present invention desirably contains a structural unit derived from a polyene, in a proportion of 0.01 mol % to 6.0 mol % and preferably in a proportion of 0.1 mol % to 4.0 mol %. Moreover, when the (Z) olefin-polyene copolymer contains a structural unit derived from an α-olefin having 3 to 12 carbon atoms, the content of the structural unit is 0.01 mol % to 15 mol % and preferably 0.1 mol % to 12 mol %.

If the (Z) olefin-polyene copolymer used in the present invention contains the structural unit derived from a polyene in a proportion within the above range, polymerization activity thereof also increases to an appropriate degree.

In addition, if the copolymer contains the structural unit derived from an α-olefin having 3 to 12 carbon atoms in a proportion within the above range, it is possible to obtain a molded article which exhibits reduced tackiness of the surface and is excellent in mechanical properties and impact properties.

(Z2) It is desirable for the (Z) olefin-polyene copolymer used in the present invention to contain 0.5 to 3 unsaturated groups per molecule on average, preferably contain 0.5 to 2.0 unsaturated groups per molecule, more preferably contain 1.0 to 2.0 unsaturated groups per molecule, particularly preferably contain 1.0 to 1.9 unsaturated groups, and most preferably contain 1.0 to 1.5 unsaturated groups. If the (Z) olefin-polyene copolymer contains unsaturated groups within the above range, since silicone is added to the entire (Z) olefin-polyene copolymer, the silylated polyolefin effectively acts on an inorganic reinforcing material, whereby it is possible to obtain a molded article which is excellent in mechanical properties and impact properties.

The content of the unsaturated group in the (Z) olefin-polyene copolymer is measured as follows. A peak area of carbon in an unsaturated portion that is measured by $^{13}$C-NMR is compared with a peak area of the entire carbon, whereby M as a number of unsaturated groups per 1,000 carbon atoms can be obtained. The content of the unsaturated group per molecule can be calculated by an equation of Mn×M/14,000 by using a number average molecular weight Mn.

In the present invention, M as a number of unsaturated groups per 1,000 carbon atoms is 1.4 to 105, preferably 1.4 to 70, and more preferably 2.8 to 70.

(Z3) A density of the (Z) olefin-polyene copolymer used in the present invention that is measured by a method using a density gradient tube is 870 kg/m$^3$ or higher, preferably 890 kg/m$^3$ or higher, and more preferably 910 kg/m$^3$ or higher. In addition, the density is 980 kg/m$^3$ or lower, preferably 970 kg/m$^3$ or lower, and more preferably 960 kg/m$^3$ or lower. If the density of the (Z) olefin-polyene copolymer is within the above range, tackiness is reduced, and dispersibility of the copolymer in a resin becomes excellent. Therefore, it is possible to obtain a molded article having excellent scratch resistance and soil resistance.

(Z4) A melting point of the (Z) olefin-polyene copolymer used in the present invention that is measured by differential scanning calorimetry (DSC) is 70° C. or higher, preferably 80° C. or higher, more preferably 90° C. or higher, and particularly preferably 100° C. or higher. In addition, the melting point is 130° C. or lower, preferably 125° C. or lower, and more preferably 120° C. or lower. If the melting point of the (Z) olefin-polyene copolymer is within the above range, tackiness is reduced, and dispersibility of the copolymer in a resin becomes excellent. Therefore, it is possible to obtain a molded article having excellent scratch resistance and soil resistance.

(Z5) A number average molecular weight (Mn) of the (Z) olefin-polyene copolymer used in the present invention that is measured by gel permeation chromatography (GPC) is in a range of 400 to 5,000, preferably in a range of 400 to 4,000, more preferably in a range of 400 to 3,000, and particularly preferably in a range of 1,500 to 2,500. If Mn of the (Z) olefin-polyene copolymer is within the above range, tackiness is reduced, and dispersibility of the copolymer in a resin becomes excellent. Therefore, it is possible to obtain a molded article having excellent scratch resistance and soil resistance.

(Z6) A ratio of a weight average molecular weight to a number average molecular weight (Mw/Mn) of the (Z) olefin-polyene copolymer used in the present invention that is measured by GPC is equal to or less than 4.0, preferably equal to or less than 3.5, and more preferably equal to or less than 3.0.

The weight average molecular weight (Mw) and number average molecular weight (Mn) are measured by gel permeation chromatography (GPC), and expressed in terms of polystyrene. Here, the measurement performed by GPC is conducted under conditions of a temperature of 140° C. by using orthodichlorobenzene as a solvent.

(Z7) A penetration hardness of the (Z) olefin-polyene copolymer used in the present invention is equal to or less than 15 dmm (1 dmm=0.1 mm), preferably equal to or less than 10 dmm, more preferably equal to or less than 3 dmm, and particularly preferably equal to or less than 1 dmm. The penetration hardness can be measured based on JIS K2207. If the penetration hardness of the (Z) olefin-polyene copolymer is within the above range, it is possible to obtain a molded article having excellent scratch resistance and soil resistance.

It is desirable for the (Z) olefin-polyene copolymer according to the present invention to satisfy one or more conditions among the (Z2) content of unsaturated groups, (Z3) density, (Z4) melting point, (Z5) number average molecular weight (Mn), (Z6) Mw/Mn (Mw: weight average molecular weight), and (Z7) penetration hardness. The (Z) olefin-polyene copolymer more preferably satisfies 2 or more conditions, even more preferably satisfies 3 or more conditions, still more preferably satisfies 4 or more conditions, yet more preferably satisfies 5 or more conditions, and particularly preferably satisfies all of 6 conditions. For example, in a particularly preferable embodiment, a (Z2-1) content of unsaturated groups is 0.5 to 3.0 unsaturated groups per molecule, a (Z3-1) density is 870 kg/m$^3$ to 980 kg/m$^3$, a (Z4-1) melting point is 70° C. to 130° C., a (Z5-1) number average molecular weight (Mn) is 400 to 5,000, and a (Z6-1) Mw/Mn (Mw: weight average molecular weight) is equal to or less than 4.0. Examples of a more preferable embodiment include an embodiment satisfying a (Z7-1) penetration hardness of equal to or less than 15 dmm, in addition to the above five conditions.

When the (Z) olefin-polyene copolymer according to the present invention is copolymerized using vinyl norbornene (5-vinyl bicyclo[2.2.1]hept-2-ene) as a polyene, it is desirable for the (Z) olefin-polyene copolymer to satisfy one or more conditions among (Z2) content of unsaturated groups, (Z3) density, (Z4) melting point, (Z5) number average molecular weight (Mn), (Z6) Mw/Mn (Mw: weight average molecular weight), and (Z7) penetration hardness. The (Z) olefin-polyene copolymer more preferably satisfies 2 or more conditions, even more preferably satisfies 3 or more conditions, still more preferably satisfies 4 or more conditions, yet more preferably satisfies 5 or more conditions, and particularly preferably satisfies all of 6 conditions. For example, in a particularly preferable embodiment, a (Z2-2) content of unsaturated groups is 0.5 to 2.0 unsaturated groups per molecule, a (Z3-2) density is 890 kg/m$^3$ to 980 kg/m$^3$, a (Z4-2) melting point is 80° C. to 130° C., a (Z5-2) number average molecular weight (Mn) is 400 to 5,000, and a (Z6-2) Mw/Mn (Mw: weight average molecular weight) is equal to or less than 4.0. Examples of a more preferable embodiment include an embodiment satisfying a (Z7-2) penetration hardness of equal to or less than 15 dmm, in addition to the above five conditions.

The (Z) olefin-polyene copolymer described above can be prepared using, for example, the following metallocene-based catalyst including a metallocene compound of a transition metal selected from group 4 on the periodic table, an organic aluminum oxy compound and/or an ionizing ionic compound. Examples of metallocene-based catalysts suitable for the present invention include catalyst for polymerizing olefins comprising (A) a metallocene compound of a transition metal selected from group 4 on the periodic table and (B) at least one or more kinds of compounds selected from (b-1) an organic aluminum oxy compound, (b-2) a compound forming an ion pair by reacting with the (A) metallocene compound, and (b-3) an organic aluminum compound, disclosed in Japanese Unexamined Patent Publication No. 2001-002731 or PCT application WO/2007/114102, WO/2007/105483, WO/2007/114009, WO/2007/122906, or the like of which the international publication has already been effected.

Specific examples of the metallocene compound of a transition metal selected from group 4 on the periodic table that is used in the present invention include bis(cyclopentadienyl)zirconium monochloride monohydride, bis(cyclopentadienyl)zirconium dichloride, bis(1-methyl-3-butylcyclopentadienyl)zirconium bis(trifluoromethanesulfonate), bis(1,3-dimethylcyclopentadienyl)zirconium dichloride, diemthyl(t-butylamide)(tetramethyl-$\eta^5$-cyclopentadienyl) silane)titanium dichloride, and the like.

Specific examples of the (B) at least one or more kinds of compounds selected from (b-1) an organic aluminum oxy compound, (b-2) a compound forming an ion pair by reacting with the (A) metallocene compound, and (b-3) an organic aluminum compound that are used in the present invention include N,N-dimethylaniliniumtetraphenylborate, N,N-dimethylaniliniumtetrakis(pentafluorophenyl)borate, N,N-dimethylaniliniumtetrakis(3,5-di-trifluoromethylphenyl)borate, N,N-diethylaniliniumtetraphenylborate, triphenylcarbenium tetrakis(pentafluorophenyl)borate, trimethyl aluminum, triisobutyl aluminum, and the like.

In the present invention, it is particularly preferable for the vinyl group-containing compound to be represented by Formula (4), since the abrasion resistance and soil resistance becomes excellent, and bleeding from the surface of a molded article is reduced.

As the silylated polyolefin used in the present invention, it is possible to use any type of silylated polyolefin prepared by any methods. However, it is preferably a silylated polyolefin obtained by sequentially performing the following [step 1] and [step 2], a derivative thereof, or a mixture of these.

[Step 1] a step of mixing and stirring a silicon-containing compound and a halogenated transition metal, and filtering the obtained suspension to obtain a transition metal catalyst composition (C) as a filtrate

[Step 2] a step of reacting the vinyl group-containing compound with the silicon-containing compound in the presence of the transition metal catalyst composition (C) obtained in the [Step 1] (here, a case that uses a compound having 2 or more SiH groups per molecule as the silicon-containing compound and a compound having 2.0 or more vinyl groups on average per molecule as the vinyl group-containing compound, is excluded)

Hereinafter, a method for preparing a silylated polyolefin will be described in detail.

[Step 1]: step of obtaining transition metal catalyst composition (C)

In [Step 1], a silicon-containing compound and a halogenated transition metal are mixed and stirred together, and the obtained suspension is filtered, thereby obtaining the transition metal catalyst composition (C) as a filtrate.

The halogenated transition metal is a halide of a transition metal of groups 3 to 12 on the periodic table of elements. In view of ease of availability and economics, the halogenated transition metal is preferably a halide of a transition metal of groups 8 to 10 on the periodic table of elements, more preferably a halide of platinum, rhodium, iridium, ruthenium, osmium, nickel, or palladium, and even more preferably a halide of platinum. The halogenated transition metal may also be a mixture of two or more kinds of halogenated transition metals.

Examples of halogen of the halogenated transition metal include fluorine, chlorine, bromine, iodine, and the like. Among these, in view of ease of handleability, chlorine is preferable.

Specific examples of the halogenated transition metal used in [Step 1] include platinum dichloride, platinum tetrachloride, platinum dibromide, platinum diiodide, rhodium trichloride, rhodium tribromide, rhodium triiodide, iridium trichloride, iridium tetrachloride, iridium tribromide, iridium triiodide, ruthenium trichloride, ruthenium tribromide, ruthenium triiodide, osmium trichloride, osmium tribromide, osmium triiodide, nickel dichloride, nickel difluoride, nickel dibromide, nickel diiodide, palladium dichloride, palladium dibromide, and palladium diiodide. Among these, platinum dichloride, palladium dichloride, ruthenium trichloride, rhodium trichloride, and iridium trichloride are preferable, and platinum dichloride is most preferable.

The halogenated transition metal used in [Step 1] is generally a powdery solid, and the particle size thereof is preferably equal to or less than 1,000 μm and more preferably equal to or less than 500 μm. The larger the particle size, the longer the time taken for preparing the transition metal catalyst composition (C).

The amount of the silicon-containing compound and the halogenated transition metal used in [Step 1] is not particularly limited, as long as the amount of the silicon-containing compound is 1 equivalent or more based on the halogenated transition metal. The amount is preferably 2 equivalent or more. If the amount of the silicon-containing compound is small, it is difficult to perform stirring that is required for preparing the transition metal catalyst composition (C).

For mixing and stirring the silicon-containing compound and the halogenated transition metal in [Step 1], any method can be used as long as the mixing and stirring can be performed. The halogenated transition metal is put in an appropriate amount into a reaction container provided with a stirrer under a nitrogen gas flow, and the silicon-containing compound is added thereto and stirred. When the amount of the silicon-containing compound and the halogenated transition metal is small, a stirrer chip may be put into a sample tube, and then the compound and metal may be put in the same manner as above and stirred.

The time taken for mixing and stirring the silicon-containing compound and the halogenated transition metal is generally 10 hours or longer, preferably 20 hours or longer, more preferably 60 hours or longer, and even more preferably 80 hours or longer. If the reaction time is short, this is not preferable since a proportion of a vinylene derivative as an isomer which is an impurity formed in the silylated polyolefin obtained in the following [Step 2] increases. There is no particular upper limit on the time taken for mixing and stirring, but in view of economics, the time is generally within 1 month.

The temperature at which the silicon-containing compound and the halogenated transition metal are mixed and stirred is not particularly limited as long as the temperature is equal to or less than a boiling point of the silicon-containing compound. The temperature is generally in a range of 0° C. to 50° C., and preferably in a range of 10° C. to 30° C. In addition, regarding the pressure, the mixing and stirring are performed at normal pressure in general. However, optionally, they can be performed under a pressurized condition or under reduced pressure.

In [Step 1], a solvent can also be used optionally. As the solvent to be used, those inactive to the silicon-containing compound and the halogenated transition metal as raw materials can be used. Specific examples of the usable solvent include aliphatic hydrocarbons such as n-hexane, alicyclic hydrocarbons such as cyclohexane, aromatic hydrocarbons such as toluene and xylene, esters such as ethyl acetate, ketones such as acetone, methyl ethyl ketone, methyl isobutyl ketone, diethyl ketone, and methyl propyl ketone, ethers such as tetrahydrofuran and 1,4-dioxane, halogenated hydrocarbon such as chloroform, dichloroethane, trichloroethane, tetrachloroethane, or perchloroethane, and the like. Among these, aromatic hydrocarbon such as toluene or xylene is particularly preferable.

When a solvent is used, the amount of the solvent used influences the solubility of raw materials. The amount of the solvent is preferably equal to or less than 100 times of the amount of raw materials, and more preferably equal to or less than 20 times of the amount of raw materials, in terms of mass. In the present invention, it is most preferable that [Step 1] be performed without using a solvent.

Next, a suspension obtained by the reaction is filtered to remove solid contents, and the transition metal catalyst composition (C) is obtained as a filtrate. The filtration method is not particularly limited, and it is possible to use general methods such as natural filtration, filtration under pressure, and filtration under reduced pressure. A filter used in the filtration is not particularly limited, and filter paper made of cellulose, a glass fiber filter, a membrane filter made of a fluororesin or cellulose acetate, or the like can be appropriately used. Among these, in view of uniformity of pore size, low hygroscopicity, chemical stability, and the like, a membrane filter made of a fluororesin is preferably used. In addition, as the filter used for filtration, a filter having pores smaller than 10 μm is preferably used, and a filter having pores equal to or smaller than 1 μm is more preferably used. If a filter having pores larger than the above size is used, solid contents of the unreacted halogenated transition metal contaminates into the catalyst. This makes the catalyst become heterogeneous and becomes a cause of increase in the amount of a formed vinylene derivative which is an impurity of the target substance to be synthesized. During the filtration, the solvent described above can also be used to wash the solid contents.

The amount of the solid contents removed by filtration, that is, the amount of the unreacted halogenated transition metal is generally equal to or less than 50% by weight and preferably equal to or less than 10% by weight, based on the amount of the halogenated transition metal used. The reaction rate of the halogenated transition metal can be adjusted mainly by varying the time for preparation.

The transition metal catalyst composition (C) prepared in this manner contains a transition metal compound having a nanocolloidal shape, a silicon-containing compound, and a solvent used optionally. The transition metal catalyst composition (C) can be used as is for the next [Step 2], and optionally, it can be used for [Step 2] after undergoing removal of the solvent, concentration, or dilution. Moreover, the silicon-containing compound can be further added thereto for dilution so as to adjust the concentration of the catalyst.

Instead of performing [Step 1], for example, commercially available transition metal catalysts such as simple platinum (platinum black), chloroplatinic acid, a platinum-olefin complex, a platinum-alcohol complex, those obtained by causing a platinum support to be supported by a support such as alumina or silica, and the like can be used. These may be used in [Step 2].

[Step 2]: Step of Reacting Vinyl Group-Containing Compound with Silicon-Containing Compound In [Step 2], the vinyl group-containing compound is reacted with the silicon-containing compound in the transition metal catalyst composition (C) obtained in the [Step 1] (here, a case that uses a compound having 2 or more SiH groups per molecule as the silicon-containing compound and a compound having 2.0 or more vinyl groups on average per molecule as the vinyl group-containing compound, is excluded), thereby obtaining a silylated polyolefin.

The silicon-containing compound used in [Step 2] can be different from the silicon-containing compound used in [Step 1], but it is preferable that the compound is the same as the compound used in [Step 1].

When the vinyl group-containing compound is reacted with the silicon-containing compound, the ratio between the amounts of the compounds varies according to the purpose. The ratio is in a range of 0.01 to 10 times of equivalent and preferably in a range of 0.1 to 2 times of equivalent, in terms of an equivalent ratio of a vinyl group in the vinyl group-containing compound to a Si—H bond in the silicon-containing compound. Herein, the amount of the silicon-containing compound is the total amount of the portion included in the transition metal catalyst composition (C) and used in [Step 1] and the portion newly added in [Step 2]. When the whole amount of the necessary silicon-containing compound is used in [Step 1], [Step 2] can be performed without addition of the silicon-containing compound.

The reaction between the vinyl group-containing compound and the silicon-containing compound is performed in the presence of the transition metal catalyst composition (C) prepared in [Step 1]. A ratio of the amount of the transition metal catalyst composition (C) to the vinyl group-containing compound is in a range of $10^{-10}$ to $10^{-1}$ times of equivalent and preferably in a range of $10^{-7}$ to $10^{-3}$ times of equivalent, in terms of an equivalent ratio of a vinyl group in the vinyl group-containing compound to the fraction of a transition metal in the transition metal catalyst composition (C).

The method for reacting the vinyl group-containing compound and the silicon-containing compound is not limited as long as the compounds react with each other finally, and for example, the reaction is performed as follows. The vinyl group-containing compound is put in a reaction container, and the silicon-containing compound and the transition metal catalyst composition (C) are put in the container in a nitrogen atmosphere. In an oil bath of which the internal temperature has been raised in advance to a temperature equal to or higher than a melting point of the vinyl group-containing compound, the reaction container is set and stirred. After the reaction, the oil bath is removed, and the container is cooled to room temperature. The obtained reaction mixture is taken out into a poor solvent such as methanol or acetone, followed by stirring for 2 hours. Thereafter, the obtained solid was collected by filtration, washed with the above poor solvent, and dried at 60° C. under a pressure reduced to 2 hPa or a lower pressure, whereby a target substance can be obtained.

The reaction between the vinyl group-containing compound and the silicon-containing compound in [Step 2] is preferably performed at a reaction temperature in a range of 100° C. to 200° C., and more preferably performed at a temperature higher than a melting point of the vinyl group-containing compound to be reacted. If the reaction temperature is lower than 100° C., this is not preferable since the reaction efficiency is lowered. In addition, regarding the pressure, the reaction can be performed at a normal pressure in general, but the reaction can be optionally performed under a pressurized condition or under reduced pressure.

In [Step 2], a solvent can be used optionally. As the solvent to be used, those inactive to the silicon-containing compound and the vinyl group-containing compound as raw materials can be used. When the compounds are reacted at normal pressure, it is preferable to use a solvent having a boiling point equal to or higher than a melting point of the vinyl group-containing compound to be reacted. Specific examples of the usable solvent include aliphatic hydrocarbons such as n-hexane, alicyclic hydrocarbons such as cyclohexane, aromatic hydrocarbons such as toluene and xylene, esters such as ethyl acetate, ketones such as acetone, methyl ethyl ketone, methyl isobutyl ketone, diethyl ketone, and methyl propyl ketone, ethers such as tetrahydrofuran and 1,4-dioxane, halogenated hydrocarbon such as chloroform, dichloroethane, trichloroethane, tetrachloroethane, or perchloroethane, and the like. Among these, aromatic hydrocarbon such as toluene or xylene is particularly preferable.

When the solvent is used, the amount of the solvent used influences the solubility of the raw materials. The amount of the solvent is preferably equal to or less than 100 times of the amount of raw materials, and more preferably equal to or less than 20 times of the amount of raw materials, in terms of weight. In the present invention, it is most preferable that [Step 2] be performed without using a solvent.

As described above, the vinyl group-containing compound is reacted with the silicon-containing compound in the presence of the transition metal catalyst composition (C), whereby a reaction mixture containing a silylated polyolefin having a structural unit represented by Formula (1) is obtained.

The reaction mixture obtained after the reaction and containing a silylated polyolefin contains an unreacted vinyl group-containing compound and a vinylene derivative as a by-product, in addition to the silylated polyolefin. The reaction mixture also contains an unreacted silicon-containing compound in some cases.

In the silylated polyolefin, a proportion of the structure derived from the structural unit represented by Formula (1) is not particularly limited, as long as the desired function of the silylated polyolefin is exhibited. The proportion is generally 5% by weight to 99% by weight and preferably 10% by weight to 95% by weight. If the structural unit is within this range, the functions such as scratch resistance and soil resistance can be exhibited, and it is reduced for the silylated polyolefin to become oily and bleed out.

In the method described above, since the highly active and highly selective transition metal catalyst composition (C) obtained in [Step 1] is used, the reaction between the vinyl group-containing compound and the silicon-containing compound in [Step 2] proceeds efficiently. Therefore, the reaction rate of the double bond of the vinyl group-containing compound is generally 90% or higher and preferably 95% or higher. In addition, the amount of the formed vinylene derivative as a by-product is generally equal to or less than 10% by weight and preferably equal to or less than 5% by weight, based on the silylated polyolefin.

The silylated polyolefin can be taken out from the above reaction mixture, by reprecipitation in a poor solvent or sludging. The poor solvent can be appropriately selected as long as the solubility of the silylated polyolefin in the solvent is low. As the poor solvent, solvents in which the above impurity is removed are preferable. Specific examples of the poor solvent include acetone, methanol, ethanol, n-propanol, isopropanol, acetonitrile, ethyl acetate, n-hexane, n-heptane, and the like. Among these, acetone and methanol are preferable.

A melt mass-flow rate (MFR) of the obtained silylated polyolefin that is measured at 190° C. under a load of 2.16 kg according to the method of JIS K7210 is 0.01 g/10 min or higher, preferably 0.1 g/10 min or higher, and more preferably 1.0 g/10 min or higher. There is no particular upper limit in MFR. This index is an index that indicates that the silylated polyolefin is not crosslinked to such a degree that impairs the fluidity of a resin.

Specific examples of the vinyl group-containing compound used in the present invention include the compound represented by Formula (4) or the (Z) olefin-polyene copolymer, as described above.

$$A\text{-}CH{=}CH_2 \qquad (4)$$

(In Formula (4), A represents a polymer chain having a structural unit derived from one or more kinds of α-olefins having 2 to 50 carbon atoms.)

When the vinyl group-containing compound is the compound represented by Formula (4), A is preferably a structure (structure 4-1) including only an α-olefin having 2 to 20 carbon atoms.

The vinyl group-containing compound more preferably has a structure (Structure 4-2) in which —CH═CH$_2$ presents on the terminal of a polymer main chain.

The vinyl group-containing compound even more preferably has a structure (Structure 4-3) in which —CH═CH$_2$ presents only on the terminal of a polymer main chain.

The vinyl group-containing compound still more preferably has a structure (structure 4-4) (combination of the structure 4-1 and structure 4-2) in which A includes only an α-olefin having 2 to 20 carbon atoms and —CH═CH$_2$ presents on the terminal of a polymer main chain.

The vinyl group-containing compound yet more preferably has a structure (structure 4-5) (combination of the structure 4-1 and structure 4-3) in which A includes only an α-olefin having 2 to 20 carbon atoms and —CH═CH$_2$ presents only on the terminal of a polymer main chain.

When the vinyl group-containing compound is (Z), a structure using vinyl norbornene as a polyene is more preferable.

Specifically, it is desirable that the silicon-containing compound of the present invention has the structures of Formula (2), as described above. Among these, when the vinyl group-containing compound is represented by Formula (4) or has the structure of (Z), preferable silicon-containing compounds are as follows respectively.

When the vinyl group-containing compound is represented by Formula (4), as the silicon-containing compound, a structure (structure 2-1) in which m=n=1 in Formula (2) is preferable, and a structure (structure 2-2) in which all of $R^{41}$ in Z in Formula (2) are selected from a hydrocarbon group and halogen is more preferable (that is, it is desirable that none of $R^{41}$ be a hydrogen atom).

In addition, when the vinyl group-containing compound is (Z), for example, when the compound has two or more vinyl groups on average per molecule, as the silicon-containing compound, a compound having a structure (structure 2-3) in which m=1 and n=0 in Formula (2) and all of $R^{41}$ in Z in Formula (2) are selected from a hydrocarbon group and halogen, or a compound having a structure (structure 2-4) in which m=0 and n=0 in Formula (4) and only one $R^{41}$ in Z in Formula (2) is a hydrogen atom is preferable.

Moreover, when the vinyl group-containing compound has less than two vinyl groups on average per molecule, as the silicon-containing compound, a compound having two or more Si—H bonds per molecule can be used, in addition to the compounds having one SiH group per molecule as the structures 2-3 and 2-4. For example, the structures 2-1 and 2-2 described above may also be employed.

Presumably, the silylated polyolefin may have a structure represented by Formula (5) to (8). Needless to say, a combination of the silicon-containing compound and the vinyl group-containing compound is not limited to these examples.

[Chem. 5]

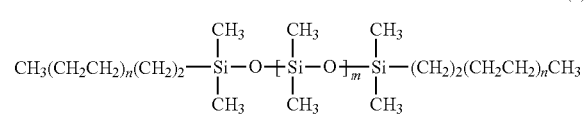
(5)

[Chem. 6]

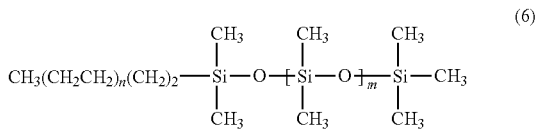
(6)

[Chem. 7]

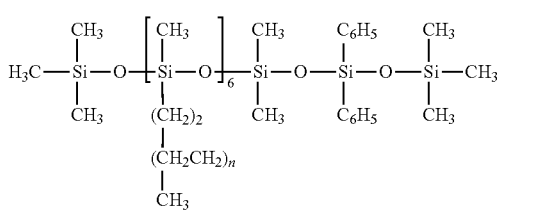
(7)

[Chem. 8]

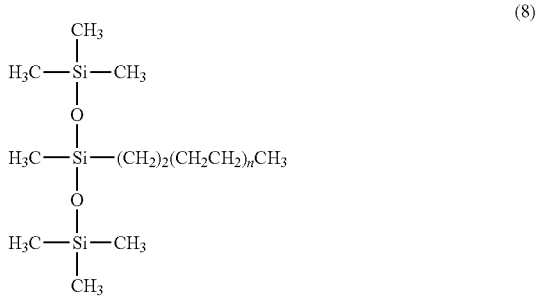
(8)

[Chem. 9]

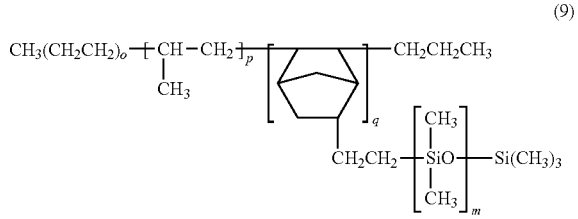
(9)

(In each of the above formulae, m, n, o, p, and q represent an integer of 1 or greater.)

Hereinafter, particularly preferable embodiments and the presumed reason why the embodiments are preferable will be described. In the following description, a portion derived from the vinyl group-containing compound will be called a "polyolefin chain", and a portion derived from the silicon-containing compound will be called a "silicon-containing compound chain" in some cases. When the vinyl group-containing compound has a structure (4-5) among structures represented by Formula (4), and the silicon-containing compound has the structure (2-2), the silylated polyolefin is considered to have a structure like a block copolymer in which (polyolefin chain)-(silicon-containing compound chain)-(polyolefin chain) bind to one another in this order. Specific examples thereof include a compound presumed to have a structure as Formula (5) as described above.

When the vinyl group-containing compound has the structure (4-5), the silicon-containing compound has the structure (2-1) and has 3 or more SiH groups, it is considered that the silylated polyolefin may include a structure in which the polyolefin chain further binds in a graft manner from the silicon-containing compound chain, in the block structure in which (polyolefin chain)-(silicon-containing compound chain)-(polyolefin chain) bind to one another in this order.

Moreover, when the vinyl group-containing compound has the structure (4-5), and the silicon-containing compound has the structures (2-3) or (2-4), it is considered that the silylated polyolefin may specifically have the structure represented by the Formula (6) or (8), for example.

Further, when the vinyl group-containing compound has the structure (4-5), and the silicon-containing compound is represented by Formula (2) in which m=0, n=0, and Z represents $(-SiH(CH_3)O-)_6-Si(CH_3)_2O-Si(C_6H_5)_2-$, it is considered that the silylated polyolefin may be in the form represented by Formula (7).

In addition, when the vinyl group-containing compound is (Z), and the silicon-containing compound has the structure (2-3), it is considered that the silylated polyolefin may have a structure represented by (9) in which (silicon-containing compound chain) is grafted onto the (polyolefin chain).

It is considered that molecular motion is easily caused in the silylated polyolefin, which is obtained from a combination of the vinyl group-containing compound and the silicon-containing compound and presumed to have a structure of a block copolymer of (polyolefin chain)-(silicon-containing compound chain)-(polyolefin chain), for example, a structure presumed to be represented by Formula (5), compared to the silylated polyolefin presumed to have a polyolefin chain as a graft chain from the silicon-containing compound chain, or the silylated polyolefin in which the polyolefin chain presumed to have the silicon-containing compound chain as a graft chain. Accordingly, it is considered that the silylated polyolefin may more easily gather on the surface of a molded article by, for example, melt molding. In addition, it is considered that in the above structure, the polyolefin chain is present on both terminals of the silicon-containing compound chain, and accordingly, the occurrence of bleed-out from the surface of a molded article may be reduced.

(Additive)

Within a range that does not impair the object and the effect of the present invention, any additive, for example, a flame retardant such as brominated bisphenol, a brominated epoxy resin, brominated polystyrene, brominated polycarbonate, triphenyl phosphate, phosphoric acid amide, or red phosphorus, a flame retardant aid such as antimony trioxide, or sodium antimonite, a thermal stabilizer such as esters of phosphoric acid or phosphorous acid, an antioxidant such as hindered phenol, a heat-resistant agent, a weather-resistant agent, a light stabilizer, a release agent, a fluidity-modifying agent, a colorant, a pigment, a lubricant, an antistatic agent, a crystal nucleating agent, a plasticizer, and a foaming agent, may be optionally mixed in an amount in which the additives produce their effect.

(Preparation of Composition)

The composition of the present invention that contains a resin and the silylated polyolefin can be prepared using any method. For example, a thermoplastic resin or a thermosetting resin, the silylated polyolefin, and other additives are melted and kneaded, whereby the composition can be obtained. Alternatively, the components are melted and mixed simultaneously or in any order, by using a tumbler, a V blender, a nauta mixer, a banbury mixer, a kneading roll, a single screw or a double screw extruder, or the like, whereby the composition can be obtained. The content of the silylated polyolefin is preferably 0.01 parts by weight to 10,000 parts by weight, more preferably 0.1 parts by weight to 1,000 parts by weight, even more preferably 0.1 parts by weight to 100 parts by weight, particularly preferably 0.5 parts by weight to 50 parts by weight, and most preferably 1 part by weight to 20 parts by weight, based on 100 parts by weight of the resin. The molded article of the present invention is industrially advantageous, since the scratch resistance or soil resistance of the molded article can be improved with a small amount of the silylated polyolefin. Particularly, as the vinyl group-containing compound, it is preferable to use a compound which is represented by the Formula (4) and has a vinyl group only on the terminal of the main chain. Moreover, as the silicon-containing compound, it is more desirable to use a compound having the structure (2-1), and it is particularly desirable to use a compound having the structure (2-2).

In the case of melting and kneading, optionally, various solvents may be used appropriately. As the solvent to be used, solvents dissolving the silylated polyolefin are preferably used. Specific examples of the usable solvent include aliphatic hydrocarbons such as n-hexane, alicyclic hydrocarbons such as cyclohexane, aromatic hydrocarbons such as toluene and xylene, esters such as ethyl acetate, ketones such as acetone, methyl ethyl ketone, methyl isobutyl ketone, diethyl ketone, and methyl propyl ketone, ethers such as tetrahydrofuran and 1,4-dioxane, halogenated hydrocarbon such as chloroform, dichloroethane, trichloroethane, tetrachloroethane, or perchloroethane, and the like. Among these, in view of the solubility of the silylated polyolefin or the reactivity with inorganic materials, aromatic hydrocarbon such as toluene or xylene is particularly preferable. Moreover, though the amount of an organic solvent used influences the solubility of the raw materials, the amount is preferably in range of equal to or less than 100 times of the weight and more preferably in a range of equal to or less than 20 times of the weight, based on the amount of the silylated polyolefin.

The reaction temperature in preparing the composition is not particularly limited as long as the silylated polyolefin and the resin are melted or dissolved. The reaction temperature is preferably in a range of 80° C. to 245° C., and in view of the time taken for melting or dissolving or a degree of kneading, the reaction temperature is preferably 100° C. to 200° C. More preferably, the reaction temperature preferably ranges from a temperature equal to or higher than a melting point of the selected silylated polyolefin and equal to or lower than a boiling point of the solvent. Moreover, the kneading time is generally in a range of 1 minute to 100 hours, and preferably in a range of 5 minutes to 50 hours, though the kneading time depends on the condition such as the kneading temperature or the amount of solvent.

The device for kneading is not limited in terms of the form, as long as the device can evenly mix and knead the silylated polyolefin and the resin. Examples of the device include a general jacket-type reactor, a kneader, a mixer, a homogenizer, a single-screw extruder, a double screw extruder, and the like.

When a solvent is used, the solvent needs to be removed after kneading ends. However, the removal is not limited in terms of the form, as long as desolventizing can be performed. Examples the desolventizing include evaporation by heating, vacuum desolventizing, stripping using inert gas, a combination of these. Alternatively, the kneaded material is discharged into a poor solvent so as to be precipitated as powder, whereby the composition can be taken out.

As the poor solvent used in this case, one or more kinds of solvents can be used by being appropriately selected from methanol, ethanol, 2-propanol, acetone, acetonitrile, hexane, heptane, octane, decane, and the like. Moreover, the obtained composition can be optionally further purified by a method of washing the composition with an appropriate solvent.

By the method described above, the composition of the present invention is formed of the silylated polyolefin and the resin. The composition can optionally contain other components. Examples of the other components include stabilizers such as Irganox (registered trademark) (manufactured by Ciba Specialty Chemicals) or Lasmit (registered trademark) (manufactured by DAI-ICHI KOGYO SEI-YAKU CO., LTD.), physical property-improving agents such as clay (manufactured by Co-op Chemical Co., Ltd.) and talc (manufactured by Asada Seifun Co., Ltd.), and the like.

When melting and kneading are performed using a tumbler, a V blender, a nauta mixer, a banbury mixer, a kneading roll, a single screw or a double screw extruder, or the like, a method of mixing the resin with the silylated polyolefin at one stage to obtain the composition is generally used. However, when there is a big difference in the molecular weight or in the melt viscosity at the molding temperature between the resin and the silylated polyolefin, or when the amount of the silylated polyolefin is small, both the components do not sufficiently disperse in some cases. Moreover, as described above, when the resin is mixed with the silylated polyolefin at one stage to obtain a composition having releasing properties, the discharge amount from the molding machine is not stabilized, and this causes problems in productivity in some cases. In addition, in the above method, a resin as a raw material having an excellent shape such as a pellet is transported into a pipe by pressure feeding or suction and supplied to a mixer, a hopper of an extruder, or the like in some cases. However, if a low-molecular weight component is used, problems that the shape cannot be maintained, and the low-molecular weight component is fused, fixed, or attached to the inner wall portion of the transport pipe member are caused in some cases.

In this case, as a preferable preparation method, a method of preparing in advance a so-called master batch that is a first resin in which the proportion of the silylated polyolefin is higher than in the composition, and then mixing the master batch with a second resin to obtain the composition is exemplified. The amount of the second resin is preferably equal to or more than 1 part by weight and equal to or less than 900 parts by weight based on 100 parts by weight of the master batch. A lower limit of the amount of the second resin is preferably 2 parts by weight, more preferably 5 parts by weight, and particularly preferably 10 parts by weight. On the other hand, an upper limit thereof is preferably 300 parts by weight, more preferably 100 parts by weight, and particularly preferably 50 parts by weight.

Needless to say, the master batch of the present invention may contain components such as known additives described above.

As the method of preparing such a master batch, known mixing methods using a tumbler, a mixer, a blender, a roll, an extruder, or the like described above can be used. In addition, even when the composition is prepared using the resin and the master batch, the same method can be used.

The form of the composition or the master batch can be appropriately designed according to the usage purpose thereof or the like. Examples of the form include a film, a powder, particles, a pellet, a plate, and the like.

(Molded Article)

The molded article of the present invention is obtained by molding the above composition by using a known molding method such as extrusion molding, injection molding, solution casting, inflation molding, compression molding, transfer molding, or cast molding. Particularly, a molding method including a heating process is preferable. It is particularly preferable to mold the composition by melt molding (extrusion molding, injection molding, inflation molding, compression molding, transfer molding, or the like). Moreover, after the composition is molded without heating, the molded article may be subjected to annealing or the like. In the case of melt molding, generally, the composition is melted by being heated up to a temperature which is equal to or higher than a melting point of the resin and enables the composition to maintain fluidity suitable for molding process. In the case of thermal treatment such as annealing, generally, the composition is heated up to a temperature at which the molded article is not melted. Particularly, in view of scratch resistance and soil resistance, a molded article obtained by melt molding is preferable.

The shape of the molded article of the present invention is generally a sheet, a film, a pipe, a tube, an irregular shape of products such as window frames or housing members, a laminate, and the like. Among these, a sheet, a film, a pipe, and a tube are preferable. The molded article is particularly preferably a molded article which is obtained by processing a molded article obtained by primary molding process using the above molding method, by a method such as blow molding or orienting. For example, when the molded article has a shape of a film or a sheet, it is preferably a molded article obtained by being molded into a sheet shape by, for example, T-die extrusion molding, and further oriented uniaxially or biaxially.

The reason why the molded article of the present invention produces effects is presumed to be as follows. During a process of molding a resin, particularly, during a process of molding by heating, the silylated polyolefin used in the present invention may be transferred to the surface of the molded article, whereby the concentration may be heightened further, compared to the average value of the entire molded article that is obtained by calculation. Accordingly, it is considered that the scratch resistance or the soil resistance of the surface of the molded article is improved with a small amount of the silylated polyolefin added. It is considered that in the composition of the present invention, even when a thermosetting resin is used as a resin, the silylated polyolefin may gather onto the surface of the molded article during a process of thermal curing, whereby it is expected that the effects will be produced. However, the thermosetting resin has a cross-linked structure. Accordingly, considering a mobility of the silylated polyolefin, it is considered that the effect of the present invention is produced markedly particularly when a thermoplastic resin is used.

The molded article of the present invention has scratch resistance against abrasion, friction, or the like and slidability. Therefore, the molded article of the present invention can be used as a material of goods that a scratch caused by friction is a problem, such as automobile interior parts including a door trim, glass run channel, a plastic syringe, a packing material, and a plastic container.

The molded article of the present invention has soil resistance such as water repellency and oil repellency. It is considered that these properties relate to gathering of the silylated polyolefin onto the surface of the molded article, as described above. Therefore, for example, the molded article can be used as a material of goods that an oil staining is a problem, such as an anti-finger print film. In addition, when the molded article is used as a container or a packing material for goods that are highly oily, it is possible to prevent the goods from being attached to the container or packing material. Examples of an index of the soil resistance include a value of surface free energy. This is because as the value of the surface free energy of the molded article decreases, the water repellency and oil repellency at the time when water or oil is attached to the surface is heightened, and this makes it difficult for the stains of water or oil to be attached.

The molded article of the present invention has gas permeability. This is because the silylated polyolefin has a property allowing gas such as oxygen, carbon dioxide, or water vapor to more easily pass through the silylated polyolefin, compared to the thermoplastic resin or thermosetting resin as a Base material. Consequently, the molded article of the present invention can be used as a film or a sheet used for, for example, an infusion pack, a hollow fiber membrane, a film for agriculture, a packing material for food, and the like. Moreover, the silylated polyolefin has, for example, a characteristic that carbon dioxide more easily penetrate the silylated polyolefin compared to oxygen. Accordingly, the molded article can also be utilized for use requiring gas selectivity. Therefore, it is possible to prepare a film or a sheet having gas permeability and gas selectivity with a high degree of scratch resistance and soil resistance. The molded article of the present invention can also be used for a portion not requiring scratch resistance, so as to utilize the gas permeability. For example, the molded article can be used as an interlayer of a laminate.

EXAMPLES

Hereinafter, the present invention will be described in more detail based on examples and the like, but the scope of the present invention is not limited to the examples and the like.

(Method of Measurement and Calculation)

A molecular weight, melting point (Tm), yield, conversion rate and isomerization rate, melt mass-flow rate (MFR), analysis of surface free energy, test for scratch resistance, surface Si concentration, average Si concentration, and permeation coefficient of oxygen, carbon dioxide, and water vapor were measured and calculated by the methods described below.

[m1] Method for Measuring Molecular Weight

A number average molecular weight Mn, a weight average molecular weight (Mw), and a molecular weight distribution (Mw/Mn) were measured as follows by using GPC- 150 manufactured by Millipore Corporation. That is, TSK GNH HT was used as a separation column, and the column size was a diameter of 7.5 mm and a length of 300 mm. The column temperature was set to 140° C., orthodichlorobenzene (Wako Pure Chemical Industries, Ltd.) was used as a mobile phase, and BHT (Takeda Pharmaceutical Company Limited.) was used as an antioxidant in an amount of 0.025% by mass, whereby the sample was moved at 1.0 ml/min. The sample concentration was set to 0.1% by mass, and the amount of the sample injected was set to 500 μl. As a detector, a differential refractometer was used. A calibration curve was created using standard polystyrene, and the molecular weight was converted into a value expressed in terms of polyethylene according to a common method.

In the following synthesis examples, all of mol numbers of the polymer as a raw material are described as values based on Mn.

[m2] Method for Measuring Melting Point

A melting point (Tm) was measured using DSC, and the obtained peak top temperature was employed as a melting point. DSC-60A manufactured by Shimadzu Corporation was used as the device. Alumina was used as a control cell, and a nitrogen flow rate was set to 50 ml/min. Moreover, the melting point was measured under a condition in which the temperature was raised up to 300° C. from 30° C. at 10° C./min. Prior to the measurement performed with raising temperature, it is desirable to unify the thermal history of the resin by performing an operation in which the temperature of the resin is temporarily raised up to about 200° C. and maintained as is for 5 minutes, and then decreased to a room temperature (25° C.) at 20° C./min.

[m3] Method for Measuring and Calculating Yield, Conversion Rate, Isomerization Rate, Unsaturated Rate of Terminal, and Number of Double Bond Per 1,000 Carbon Atoms by NMR Analysis The yield, conversion rate, isomerization rate, unsaturated rate of a terminal, and number of double bonds per 1,000 carbon atoms of the silylated polyolefin are determined by $^1$H-NMR. The yield is defined as a ratio of the mole number of the obtained silylated polyolefin to the mole number of the vinyl group-containing compound as a raw material, the conversion rate is defined as a ratio of the mole number of the consumed vinyl group-containing compound to the mole number of the vinyl group-containing compound as a raw material, the isomerization rate is defined as a ratio of the mole number of the formed vinylene derivative to the mole number of the vinyl group-containing compound as a raw material, and the unsaturated rate of a terminal is defined as a ratio of the vinyl group on the main chain terminal to the sum of the vinyl group on the main chain terminal and the terminal methyl group of the vinyl group-containing compound as a raw material. In addition, the number of vinyl groups per 1,000 carbon atoms is defined as a number which is obtained by correcting the ratio of the number of vinyl groups to the number of carbon atoms derived from the number of protons into the number of vinyl groups per 1,000 carbon atoms. Moreover, the unsaturated rate of a terminal and the number of vinyl groups per 1,000 carbon atoms are generally applied to the vinyl group-containing compound as a raw material. However, when a degree of hydrosilylation is insufficient, these are also applied to the silylated polyolefin in some cases, as indices indicating residual amount of the unreacted raw material.

For example, a peak (C) of 6 protons of methylene of an ethoxy group of a silylated polyolefin, which is obtained by hydrosilylating a compound that includes only ethylene and contains a vinyl group on a main chain terminal with triethoxysilane, is observed at 3.8 ppm, and a peak (D) of 2 protons of a isomerized vinylene group is observed at 5.4 ppm. When the degree of hydrosilylation is insufficient, a peak (E) of 2 protons of the unreacted vinyl group is observed at 4.8 ppm to 5.1 ppm, and a peak (F) of 1 proton is observed at 5.6 ppm to 5.8 ppm. Regarding the vinyl group-containing compound as a raw material, main chain methylene (G) of 2 protons is observed at 1.0 ppm to 1.5 ppm. When the compound does not have a vinyl group on the main chain terminal, terminal methyl (H) of 3 protons is observed at 0.8 ppm. In addition, a peak (I) of 2 protons on carbon adjacent to a double bond is observed at 1.9 ppm.

When the peak area of each of the peaks (C), (D), (E), (F), (G), (H), and (I) is named SC, SD, SE, SF, SG, SH, and SI respectively, the yield (YLD(%)), conversion rate (CVS (%)), isomerization rate (ISO(%)), unsaturated rate of a terminal (VE(%)), and number of double bonds per 1,000 carbon atoms (VN (number of double bonds/1000 C)) are calculated by the following formulae.

$$YLD(\%)=(SC/3)/(SC/3+SD+SE)\times 100$$

$$CVS(\%)=\{1-SE/(SC/3+SD+SE)\}\times 100$$

$$ISO(\%)=SD/(SC/3+SD+SE)\times 100$$

$$VE(\%)=SE/(SE/2+SH/3)\times 100$$

$$VN(\text{number of double bonds}/1000C)=(SE+SF)/3\times 1000/\{(SD+SE+SF+SG+SH+SI)/2\}$$

[m4] Method for Measuring Melt Mass-Flow Rate (MFR)

A melt mass-flow rate (MFR) of polyethylene as the vinyl group-containing compound was measured at 190° C. under a load of 2.16 kg by using a melt indexer T-111 manufactured by Tokyo Seiki Co., Ltd. A MFR of polypropylene as a thermoplastic resin was measured at 230° C. under a load of 2.16 kg by using a melt indexer T-111 manufactured by Tokyo Seiki Co., Ltd.

[m5] Method for Analyzing Surface Free Energy

By using an image processing-type solid-liquid interface analyzing system (Dropmaster 500 manufactured by Kyowa Interface Science Co., LTD.), 3 types of measurement liquids for testing wetting tension (water, diodomethane, and bromonaphthalene) of which the surface tension had been clarified were dropped onto the surface of test samples in an atmosphere of 23° C. and 50% RH, thereby measuring a contact angle. The measurement was performed on 5 sheets of test samples, and an average thereof was calculated. Points (5 or more points) which were obtained from cos θ (Y axis) calculated from the contact angle θ and the surface tension (X axis) of the mixed liquid for test were plotted on an X-Y coordinate. The surface tension (X axis) corresponding to the point where a straight line obtained by a least-squares method of those points intersects cos θ=1 was taken as a surface free energy (mN/m). The measurement conditions are summarized below.

Tester: Dropmaster 500 as an image processing-type solid-liquid interface analyzing system Number of test: n=5 respectively Test liquid: measurement liquid for testing wetting tension (water, diodomethane, and bromonaphthalene; manufactured by Wako Pure Chemical Industries, Ltd.)

Temperature and humidity for measurement: 23° C./50% RH

In addition, during the measurement of the surface free energy, films prepared in the respective examples and comparative examples were used as test samples, and the surface free energy of the film surface of a chill roll surface side at the time of film molding was measured.

[m6] Test for Scratch Resistance

By using a reciprocating abrasion tester (manufactured by Shinto Scientific Co., Ltd. 30S model), the surface of the sample fixed to a curved surface was rubbed back and forth 1,000 times against a friction member (manufactured by SUS 20×20 mm, 45 R tip) covered with cotton cloth (white cotton cloth, calico No. 3) at a stroke of 100 mm and 30 times/min under a load of 500 g. Thereafter, whether or not the sample surface was scratched was visually confirmed. A scratchless state was determined to be ◯, a state where only the film of the polypropylene as a base material was scratched was determined to be X, and an in-between state of the scratch was determined to be Δ.

[m7] Measurement of Surface Si Concentration

By using an analyzer (manufactured by VG corporation, ESCALAB220iXL) for X-ray electron spectroscopy for chemical analysis (ESCA), a wide spectrum in an analysis area of Ø 150 μm was measured using ALKα 150 W as an X-ray source. From a peak area of an element detected by the wide spectrum, a compositional ratio (atm %) of each element was calculated, and the compositional ratio of silicon obtained in this manner was divided by a compositional ratio of carbon so as to calculate a ratio (Si/C) of silicon atoms present in the surface to a single carbon atom.

[m8] Calculation of Average Si Concentration

The average Si concentration in the composition (present ratio of silicon atoms to a single carbon atom (Si/C)) can be calculated from the molecular formula of the silylated polyolefin and the concentration thereof in the composition as well as the molecular formula of the thermoplastic resin or thermosetting resin as a base material and the concentration thereof in the composition. Herein, the calculation method in a case where the vinyl group-containing compound as a raw material compound of the silylated polyolefin is a polymer which contains only a structural unit derived from ethylene and contains a vinyl group on the main chain terminal and dimethyl siloxane, and the base material is homopolypropylene is exemplified. The concentration of the dimethyl siloxane in the silylated polyolefin can be calculated from the molecular formula of the raw material used for synthesizing the silylated polyolefin. However, provided that the concentration is 26% by weight, the average concentration of polydimethyl siloxane of the composition, which is obtained by adding 10 parts molecular weight of the silylated polyolefin to 90 parts by weight of the polypropylene as a base material, becomes 2.6% by weight. The molecular formula per unit of the dimethyl siloxane is $(C_2H_6SiO)n$ (unit molecular weight of 74.15), the molecular formula per unit of polyolefin of the silylated polyolefin is $(C_2H_4)n$ (unit molecular weight of 28.05), and the molecular formula per unit of polypropylene as a base material is $(C_3H_6)n$ (unit molecular weight of 42.08). Accordingly, 1 kg of the composition contains dimethyl siloxane in an amount of 1000×2.6/100/74.15=0.35 units, polyolefin of the silylated polyolefin in an amount of 1000×(10−2.6)/100/28.25=2.6 units, and polypropylene as a base material in an amount of 1000×90/100/42.08=21.4 units. Consequently, in 1 kg of the composition, the concentration of Si (silicon) is 0.35 mol, and the concentration of C (carbon) is 0.35×2+2.6×2+21.4×3=70.1 mol. Therefore, the average Si concentration (present ratio of silicon atoms to a single carbon atom (Si/C)) in the composition is calculated to be 0.35/70.1=0.005.

[m9] Method for Measuring Permeation Coefficient of Oxygen and Carbon Dioxide

The permeation coefficient of oxygen and carbon dioxide was measured at a test temperature of 23° C. and a test humidity of 0% RH in a measurement area of 5 $cm^2$, by using a differential pressure-type gas permeability analyzer manufactured by Tokyo Seiki Co., Ltd.

[m10] Method for Measuring Permeation Coefficient of Water Vapor

The permeation coefficient of water vapor was measured at a test temperature of 40° C. and a test humidity of 90% RH in a measurement area of 50 $cm^2$, by using a water vapor permeability analyzer manufactured by Hitachi High-Technologies Corporation.

When the silylated polyolefin is obtained by copolymerizing an olefin as a raw material compound and a polyene, properties of raw material compounds (F1) and (F2) of the silylated polyolefin were measured by the following method.

(Method for Measuring Content of Structural Unit Derived from Polyene or α-Olefin)

For measuring the content of the structural unit derived from a diene or an α-olefin in the olefin-polyene copolymer (Z), a peak area of carbon in an unsaturated portion and a peak area of the entire carbon that are obtained by $^{13}$C-NMR are compared to each other, or a peak area of carbon in the α-olefin portion and a peak area of the entire carbon that are obtained by $^{13}$C-NMR are compared to each other, whereby the number of unsaturated groups M per 1,000 carbon atoms can be obtained.

(Method for Measuring Number of Unsaturated Groups Per Molecule)

The content of unsaturated groups per molecule can be calculated by Mn×M/14,000, by using a number average molecular weight Mn and the number of unsaturated group M per 1,000 carbon atoms obtained as above.

(Method for Measuring Density)

Density was measured by a method using a density gradient tube based on JIS K7112.

Synthesis Example 1

Synthesis of Polyethylene Having a Vinyl Group on One Terminal 3.89 g (15.0 mmol) of 3-cumyl-5-methyl salicylaldehyde, 30 ml of toluene, 1.75 g (40% aqueous solution, 22.5 mmol) of methylamine were put in a 100 ml of reactor that was sufficiently dried and purged with nitrogen, followed by stirring for 5 hours at room temperature. The reaction solution was concentrated under reduced pressure and purified with silica gel column chromatography, thereby obtaining 3.87 g (yield 97%) of a yellow oily compound (L-1).

$^1$H-NMR (CDCl$_3$): 1.69 (s, 6H), 2.34 (s, 3H), 3.33 (s, 3H), 6.93-7.29 (m, 7H), 8.21 (s, 1H), 13.5 (s, 1H)

1.12 g (4.00 mmol) of the compound (L-1) obtained above and 25 ml of diethyl ether were put in a 100 ml of a reactor that was sufficiently dried and purged with argon. The reactor was cooled to −78° C., followed by stirring. 2.58 ml of n-butyl lithium (n-hexane solution, 1.55M, 4.00 mmol) was added dropwise thereto over 5 minutes, followed by stirring for 2 hours at the same temperature. Thereafter, the temperature thereof was slowly increased to room temperature, followed by stirring again for 3 hours at room temperature, thereby preparing a lithium salt. This solution was added dropwise to 25 ml of a tetrahydrofuran solution which was cooled to −78° C. and contained 0.76 g (2.00 mmol) of a ZrCl$_4$(THF)$_2$ complex. After the dropwise addition ended, stirring was continued while the temperature thereof was being slowly increased to room temperature. The resultant was stirred again for 12 hours at room temperature, and then the solvent was evaporated from the reaction solution. The obtained solid was dissolved in 50 ml of methylene chloride, and the insoluble material was removed by a glass filter. The filtrate was concentrated under reduced pressure, and the precipitated solid was reprecipitated in n-hexane, followed by drying under reduced pressure, thereby obtaining 1.10 g (yield 79%) of a yellow powdery compound (B-1).

$^1$H-NMR (CDCl$_3$): 0.86-1.91 (m, 18H), 2.35 (s, 6H), 6.92-7.52 (m, 14H), 7.78 (s, 2H)

1000 ml of heptane was put at room temperature into a stainless steel autoclave that was sufficiently purged with nitrogen and had an internal volume of 2000 ml, and the temperature thereof was increased to 150° C. Thereafter, the internal pressure of the autoclave was increased using ethylene at 30 kg/cm$^2$G, and the temperature thereof was maintained. 0.5 ml (0.5 mmol) of a hexane solution (1.00 mmol/ml expressed in terms of an aluminum atom) containing MMAO (manufactured by Tosho Finechem Corporation.) was put into the autoclave by pressure, 0.5 ml (0.0001 mmol) of a toluene solution including the compound B-1 (0.0002 mmol/ml) was then added thereto, and polymerization was started. The polymerization was performed at 150° C. for 30 minutes in an ethylene gas atmosphere, and then a small amount of methanol was added thereto by pressure to stop the polymerization. The obtained polymer solution was added to 3 L of methanol containing a small amount of hydrochloric acid, thereby precipitating the polymer. The polymer was washed with methanol and then dried under reduced pressure for 10 hours at 80° C.

By $^1$H-NMR measurement, it was clarified that the obtained polymer is homopolyethylene and contains a double bond only on one terminal. In addition, an unsaturated rate of a terminal (VE), which was calculated from an integral value SH=3.00 of the terminal methyl group including polyethylene as an impurity having saturated both terminals and an integral value SE=1.92 of the vinyl group, was 98%. The result of $^1$H-NMR measurement and physical properties of the ethylene-based polymer (P-1) (simple substance) containing a double bond on one terminal are as follows.

$^1$H-NMR: δ (C$_6$D$_6$): 0.81 (t, 3H, J=6.9 Hz), 1.10-1.45 (m), 1.93 (m, 2H), 4.80 (dd, 1H, J=9.2, 1.6 Hz), 4.86 (dd, 1H, J=17.2, 1.6 Hz), 5.60-5.72 (m, 1H)

Melting point (Tm) 123° C.
Mw=1900, Mw/Mn=2.24 (GPC)
Unsaturated rate of terminal 98%

Synthesis Example 2

An ethylene-based polymer (P-2) having a vinyl group on one terminal was synthesized in the same manner as in Synthesis example 1, except that the methylamine used in Synthesis example 1 was changed to ethylamine at the same molar amount. The physical properties of the ethylene-based polymer (P-2) (simple substance) having a vinyl group on one terminal are as follows.

Melting point (Tm) 123° C.
Mw=4770, Mw/Mn=2.25 (GPC)
Unsaturated rate of terminal 97%

Synthesis Example 3

Preparation of Platinum Catalyst Composition (C-1)

In a 50 ml sample tube containing a magnetic stirrer chip, 0.50 g of platinum (II) chloride was suspended in hydrosilane A (10 ml) (HS(A), manufactured by Momentive Performance Materials, Japan, limited liability corporation, product number: XF40-C2195) having the following structure, followed by stirring at room temperature under a nitrogen gas flow. After the stirring was performed for 190 hours, about 0.4 ml of the reaction solution was collected by a syringe and filtered using a 0.45 μm PTFE filter, and the filtrate was collected into a 10 ml sample tube, thereby obtaining a platinum catalyst composition (C-1) in which a platinum concentration was 3.8% by weight.

Hydrosilane A (HS(A)): HSi(CH$_3$)$_2$O—(—Si(CH$_3$)$_2$—O—)$_{18}$—Si(CH$_3$)$_2$H Synthesis Example 4

Preparation of Platinum Catalyst Composition (C-2)

In a 50 ml sample tube containing a magnetic stirrer chip, 0.50 g of chloroplatinic (IV) acid was diluted with isopropyl alcohol to adjust the total amount thereof to 16.7 g, thereby obtaining a platinum catalyst composition (C-2) in which a platinum concentration was 1.1% by weight.

Synthesis Example 5

Introduction of Polyethylene Having Terminal Vinyl Group into Hydrosilane-1

10.0 g (11.8 mmol) of the ethylene polymer (P-1) containing a vinyl group on one terminal that was obtained in [Synthesis example 1] was put in a 300 ml two-neck flask. In a nitrogen atmosphere, 8.7 g (5.9 mmol; corresponding to 11.8 mmol as a Si—H group) of hydrosilane A (HS(A)) and 150 μl (1.4×10$^{-6}$ mmol expressed in terms of Pt) of (C-1a) which was obtained by 200-fold diluting the platinum catalyst composition (C-1) prepared in [Synthesis example 3] with hydrosilane (HS(A)) were added thereto. The above reactor was set into an oil bath of which the temperature was raised in advance to 130° C., followed by stirring. About 3 minutes later, the polymer was melted. 6 hour later, the resultant was cooled, about 200 ml of methanol was then added thereto, and the content was taken out to a 300 ml beaker, followed by stirring for 2 hours. Subsequently, the solid was collected by filtration, washed with methanol, and dried at 60° C. under reduced pressure of equal to or less than 2 hPa, thereby obtaining 18.5 g of silylated polyolefin (A-1) as a white solid. As a result of NMR analysis, the yield of the obtained silylated polyolefin (A-1) was 99%, the olefin conversion rate thereof was 100%, and the isomerization rate thereof was 1%. MFR was equal to or higher than the upper limit of measurement (MFR>100 g/10 min), and the content of polyorganosiloxane in (A-1) calculated from the molecular formula was 46% by weight.

Synthesis Example 6

Introduction of Polyethylene Having Terminal Vinyl Group into hydrosilane-2

33.1 g of a silylated polyolefin (A-2) as a white solid was obtained in the same manner as in Synthesis example 5, except that 10.0 g of the ethylene polymer (P-1) containing a vinyl group on one terminal was replaced with 25.1 g (11.8 mmol) of the ethylene-based polymer (P-2) containing a vinyl group on one terminal of [Synthesis example 2]. As a result of NMR analysis, the yield of the obtained silylated polyolefin (A-2) was 98%, the olefin conversion rate thereof was 100%, and the isomerization rate thereof was 2%. MFR was equal to or higher than the upper limit of measurement (MFR>100 g/10 min), and the content of polyorganosiloxane in (A-2) calculated from the molecular formula was 26% by weight.

Synthesis Example 7

Introduction of Polyethylene Copolymer Having Terminal Vinyl into Hydrosilane-1

958 ml of hexane, 5 ml of propylene, and 37 ml of vinyl norbornene (5-vinylcyclo[2.2.1]hept-2-ene) were put into a stainless steel autoclave that was sufficiently purged with nitrogen and had an internal volume of 2 L, and hydrogen was introduced into the autoclave until the pressure (gauge pressure) became 0.26 MPa. Thereafter, the temperature of the system was raised to 150° C., and then 0.3 mmol of triisobutyl aluminum, 0.004 mmol of triphenyl carbenium tetrakis(pentafluorophenyl) borate, and 0.02 mmol of dimethyl(t-butylamide)(tetramethyl-$\eta^5$-cyclopentadienyl)silane titanium dichloride (manufactured by Sigma-Aldrich Co.) were injected into the autoclave with ethylene to start polymerization. Subsequently, only ethylene was continuously supplied to keep the whole pressure at 2.9 MPa (gauge pressure), and polymerization was performed for 20 minutes at 150° C. A small amount of ethanol was added into the system to stop polymerization, and then the unreacted ethylene and vinyl norbornene were purged. The obtained polymer solution was dried over night at 100° C. under reduced pressure.

In the above manner, a vinyl group-containing compound (P-3) of which a number of unsaturated groups per 1,000 carbon atoms is 8.8, a number of propylene per 1,000 carbon atom is 1.5, an (average) content of unsaturated groups is 1.0 group/molecule, a density is 959 kg/m$^3$, a melting point is 119° C., Mn is 1,600, Mw is 4,300, and Mw/Mn is 2.7 was obtained.

160 g of the vinyl group-containing compound (P-3) was reacted for 5 hours with 80 g of hydrosilane B (HS(B), manufactured by Gelest, Inc.) represented by the following general structural formula, 2 L of xylene, and 0.5 g of the platinum catalyst composition (C-2) prepared in Synthesis example 4 under xylene reflux. The solvent was evaporated by heating under reduced pressure, thereby obtaining a silicone-modified wax (A-3) as silylated polyolefin. MFR of the silicone-modified wax (A-3) was equal to or higher than the upper limit of measurement (MFR>100 g/10 min), and the content of polyorganosiloxane in (A-3) calculated from the molecular formula was 32% by weight.

Hydrosilane B (HS(B)): $C_4H_9$—$((CH_3)_2SiO)_9$—$(CH_3)_2SiH$

Synthesis Example 8

Based on the method of Example 1 of Japanese Unexamined Patent Publication No. H4-57844, silicone-modified polyethylene in which polyorganosiloxane has been grafted onto a polyethylene chain was synthesized by the following method.

20 g of linear low-density polyethylene (manufactured by Japan Polyethylene Corporation, product number: UF840), 30 g of a silicone gum stock of which the viscosity at 23° C. is 300,000 cs and the content of methyl vinyl silicone is 1.0%, 0.26 g of 2,5-dimethyl 2,5-di(t-butylperoxy)hexyne-3 (manufactured by NOF CORPORATION), 0.26 g of 1,6-hexanediol methacrylate, 1.3 g of 1,2-polybutadiene having a molecular weight of about 1,000, and an antioxidant (manufactured by BASF, trade name of Irganox 1010) were kneaded at 180° C. for 10 minutes with a kneading extruder, thereby obtaining silicone-modified polyethylene (G-1). MFR of the obtained silicone-modified polyethylene (G-1) was 0.7 g/10 min, and the content of polyorganosiloxane in (G-1) calculated from the amount thereof added was 60% by weight.

Example 1

94.4 parts by weight of polypropylene (polypropylene F107 manufactured by Prime Polymer Co., Ltd., MFR of 6.6 g/10 min) was dry-blended with 5.6 parts by weight of the silylated polyolefin (A-1), and the resultant was melted and mixed at a cylinder temperature of 200° C. by using a double screw extruder (L/D=60) TEM-26SS manufactured by TOSHIBA MACHINE CO., LTD, thereby obtaining a resin composition (D-1). The obtained resin composition (D-1) was molded into a single layer film of D-1 at a T-die temperature of 210° C. by using a molding machine for molding three three-layer film manufactured by Thermoplastics Co, Inc. The thickness of the film was 50 (μm). The surface Si concentration of the obtained single layer film that was measured by ESCA was 0.060 (Si/C) which greatly exceeded 0.005 as the average of the whole composition. Therefore, it was clarified that the silylated polyolefin (A-1) had transferred onto the surface and had been concentrated. In addition, the surface free energy of this film was 24.8 mN/m, the result of the test for abrasion resistance thereof was excellent (○, no scratch), the permeation coefficient of oxygen thereof was 110 cm$^3$·mm/(m$^2$·24 h·atm), the permeation coefficient of carbon dioxide thereof was 385 cm$^3$·mm/(m$^2$·24 h·atm), and the permeation coefficient of water vapor thereof was 0.421 g·mm/(m$^2$·24 h). These results are shown together in Table 1.

Example 2

90 parts by weight of polypropylene (polypropylene F107 manufactured by Prime Polymer Co., Ltd.) was dry-blended with 10 parts by weight of the silylated polyolefin (A-2), and the resultant was melted and mixed at a cylinder temperature of 200° C. by using a double screw extruder (L/D=60) TEM-26SS manufactured by TOSHIBA MACHINE CO., LTD, thereby obtaining a resin composition (D-2). The obtained resin composition (D-2) was molded into a single layer film of D-2 at a T-die temperature of 210° C. by using a molding machine for molding three three-layer film manufactured by Thermoplastics Co, Inc. The thickness of the film was 50 (μm). The surface Si concentration of the obtained single layer film that was measured by ESCA was 0.063 (Si/C) which greatly exceeded 0.005 as the average of the whole composition. Therefore, it was clarified that the silylated polyolefin (A-2) had transferred onto the surface and had been concentrated. In addition, the surface free energy of this film was 24.7 mN/m, the result of the test for abrasion resistance thereof was excellent (○, no scratch), the permeation coefficient of oxygen thereof was 106 cm$^3$·mm/(m$^2$·24 h·atm), the permeation coefficient of carbon dioxide thereof was 379 cm$^3$·mm/(m$^2$·24 h·atm), and the permeation coefficient of water vapor thereof was 0.411 g·mm/(m$^2$·24 h). These results are shown together in Table 1.

Example 3

91.8 parts by weight of polypropylene (polypropylene F107 manufactured by Prime Polymer Co., Ltd.) was dry-blended with 8.2 parts by weight of the silylated polyolefin (A-3), and the resultant was melted and mixed at a cylinder temperature of 200° C. by using a double screw extruder (L/D=60) TEM-26SS manufactured by TOSHIBA MACHINE CO., LTD, thereby obtaining a resin composition (D-3). The obtained resin composition (D-3) was molded into a single layer film of D-3 at a T-die temperature of 210° C. by using a molding machine for molding three three-layer film manufactured by Thermoplastics Co, Inc. The thickness of the film was 50 (μm). The surface Si concentration of the obtained single layer film that was measured by ESCA was 0.015 (Si/C) which greatly exceeded 0.005 as the average of the whole composition. Therefore, it was clarified that the silylated polyolefin (A-3) had transferred onto the surface. The results are shown together in Table 1.

machine for molding three three-layer film manufactured by Thermoplastics Co, Inc. The thickness of the film was 50 (μm). The surface Si concentration of the obtained single layer film that was measured by ESCA was 0.000 (Si/C). The results are shown together in Table 1.

TABLE 1

|  | Properties of silylated polyolefin | | | Composition | | | | | | | |
|---|---|---|---|---|---|---|---|---|---|---|---|
|  |  |  |  |  | Average Si concentration (Si/C) Calculated value | Surface Si concentration (Si/C) Actually measured value | Surface free energy (mN/m) | Scratch resistance | Permeation coefficient of $O_2$*[2] | Permeation coefficient of $CO_2$*[2] | Permeation coefficient of water vapor*[3] |
|  | Name | Content of polyorganosiloxane (% by weight) | MFR (g/10 min) | Base resin | Amount of silylated polyolefin added (wt %) |  |  |  |  |  |  |  |
| Example 1 | A-1 | 46% | >100 | PP (F107) | 5.6% | 0.005 | 0.060 | 24.8 | ○ | 110 | 385 | 0.421 |
| Example 2 | A-2 | 26% | >100 | PP (F107) | 10.0% | 0.005 | 0.063 | 24.7 | ○ | 106 | 379 | 0.411 |
| Example 3 | A-3 | 32% | >100 | PP (F107) | 8.2% | 0.005 | 0.015 | 30.6 | Δ | 100 | 362 | 0.403 |
| Comparative example 1 | G-1 | 60% | 0.7 | PP (F107) | 4.3% | 0.005 | 0.009 | 30.2 | X*[1] | 102 | 360 | 0.405 |
| Comparative example 2 | — | — | — | PP (F107) | 0.0% | 0.000 | 0.000 | 32.2 | X | 57 | 178 | 0.241 |

*[1]Scratch could not be judged due to roughening of film surface at the time of molding
*[2]Unit: $cm^3 \cdot mm/(m^2 \cdot 24\ h \cdot atm)$
*[3]Unit: $g \cdot mm/(m^2 \cdot 24\ h)$ Comparative Example 1

95.7 parts by weight of polypropylene (polypropylene F107 manufactured by Prime Polymer Co., Ltd.) was dry-blended with 4.3 parts by weight of the silicone-modified polyethylene (G-1), and the resultant was melted and mixed at a cylinder temperature of 200° C. by using a double screw extruder (L/D=60) TEM-26SS manufactured by TOSHIBA MACHINE CO., LTD, thereby obtaining a resin composition (D-4). The obtained resin composition (D-4) was molded into a single layer film of D-4 at a T-die temperature of 210° C. by using a molding machine for molding three three-layer film manufactured by Thermoplastics Co, Inc. The thickness of the film was 50 (μm). The surface Si concentration of the obtained single layer film that was measured by ESCA was 0.009 (Si/C), and this was way below the surface Si concentration of the all of the compositions of Examples 1 to 3 even though the average Si concentration was the same. Therefore, it was clarified that it is difficult for the silylated polyolefin out of the scope of the present application to transfer onto the surface. The results are shown together in Table 1.

Comparative Example 2

Polypropylene (polypropylene F107 manufactured by Prime Polymer Co., Ltd.) was molded into a single layer film at a T-die temperature of 210° C. by using a molding Example 4

70 parts by weight of polypropylene (polypropylene F107 manufactured by Prime Polymer Co., Ltd., MFR of 6.6 g/10 min) and 30 parts by weight of the silylated polyolefin (A-1) were put in a micro-compounder (manufactured by DSM; DSM-Xplore) and kneaded for 5 minutes at a rotation frequency of 100 rpm at a kneading temperature of 230° C., thereby obtaining a resin composition.

The resin composition was subjected to heat press molding. Molding was performed by a method in which the composition was pressed for 5 minutes by a vacuum heat press machine under heating at 230° C. and then taken out, followed by rapid cooling to room temperature. In this manner, a heat press sheet having a thickness of about 200 μm was obtained.

This sheet was evaluated in terms of the permeation coefficient of oxygen, carbon dioxide, and water vapor as well as scratch resistance. The results are shown in Table 2.

In addition, haze and total light transmittance of this sheet were measured using a haze meter NDH-2000 manufactured by NIPPON DENSHOKU INDUSTRIES Co., LTD. As a result, the haze was 39% and the total light transmittance was 92%.

Example 5

A heat press sheet having a thickness of about 200 μm was obtained in the same manner as in Example 4, except that the silylated polyolefin (A-1) was replaced with the silylated polyolefin (A-2) in Example 4.

This sheet was evaluated in terms of the permeation coefficient of oxygen, carbon dioxide, and water vapor as well as scratch resistance. The results are shown in Table 2.

In addition, haze and total light transmittance of this sheet were measured using a haze meter NDH-2000 manufactured by NIPPON DENSHOKU INDUSTRIES Co., LTD. As a result, the haze was 62% and the total light transmittance was 93%.

Comparative Example 3

A heat press sheet having a thickness of about 200 μm was obtained in the same manner as in Example 4, except that the silylated polyolefin (A-1) was not used in Example 4.

This sheet was evaluated in terms of the permeation coefficient of oxygen, carbon dioxide, and water vapor as well as scratch resistance. The results are shown in Table 2.

In addition, haze and total light transmittance of this sheet were measured using a haze meter NDH-2000 manufactured by NIPPON DENSHOKU INDUSTRIES Co., LTD. As a result, the haze was 25% and the total light transmittance was 92%.

This resin composition was subjected to injection molding under conditions of a cylinder temperature of 200° C. and a mold temperature of 40° C., by using an injection molding machine NEX30-3E manufactured by Nissei Plastic Industrial Co., Ltd., thereby obtaining an injection-molded plate having a size of 70 mm×70 mm×2 mm.

The abrasion loss and friction coefficient of the obtained injection-molded plate were measured in accordance with JIS K7218A (load: 75 N, speed: 0.1 m/s, distance: 3 km). As a result, the abrasion loss was 0.001 g, and the friction coefficient was 0.31. Moreover, the opposite material used for the measurement was S45C.

TABLE 2

| | Properties of silylated polyolefin | | | Composition | | | | | |
|---|---|---|---|---|---|---|---|---|---|
| | | | | Amount of | | | | | Permeation |
| | Name | Content of polyorganosiloxane (% by weight) | MRF (g/10 min) | Base resin | silylated polyolefin added (wt %) | Scratch resistance | Permeation coefficient of $O_2$*[1] | Permeation coefficient of $CO_2$*[1] | coefficient of water vapor*[2] |
| Example 4 | A-1 | 46 | >100 | PP (F107) | 30 | ○ | 517 | 2397 | 1.580 |
| Example 5 | A-2 | 26 | >100 | PP (F107) | 30 | ○ | 221 | 832 | 0.727 |
| Comparative example 3 | — | — | — | PP (F107) | — | X | 50 | 169 | 0.214 |

*[1]Unit: $cm^3 \cdot mm/(m^2 \cdot 24\ h \cdot atm)$
*[2]Unit: $g \cdot mm/m^2 \cdot 24\ h)$

Example 6

95.0 parts by weight of polypropylene (polypropylene F107 manufactured by Prime Polymer Co., Ltd., MFR of 6.6 g/10 min) was dry-blended with 5.0 parts by weight of the silylated polyolefin (A-1), and the resultant was melted and mixed at a cylinder temperature of 200° C. by using a double screw extruder (L/D=60) TEM-26SS manufactured by TOSHIBA MACHINE CO., LTD, thereby obtaining a resin composition.

This resin composition was subjected to injection molding under conditions of a cylinder temperature of 200° C. and a mold temperature of 40° C., by using an injection molding machine NEX30-3E manufactured by Nissei Plastic Industrial Co., Ltd., thereby obtaining an injection-molded plate having a size of 70 mm×70 mm×2 mm.

The abrasion loss and friction coefficient of the obtained injection-molded plate were measured in accordance with JIS K7218A (load: 75N, speed: 0.1 m/s, distance: 3 km). As a result, the abrasion loss was 0.001 g, and the friction coefficient was 0.22. Moreover, the opposite material used for the measurement was S45C.

In addition, the total light transmittance of the molded plate that was measured using haze meter NDH2000 manufactured by NIPPON DENSHOKU INDUSTRIES Co., LTD. was 85%. The results are shown together in Table 3.

Example 7

97.2 parts by weight of polypropylene (polypropylene F107 manufactured by Prime Polymer Co., Ltd., MFR of 6.6 g/10 min) was dry-blended with 2.8 parts by weight of the silylated polyolefin (A-1), and the resultant was melted and mixed at a cylinder temperature of 200° C. by using a double screw extruder (L/D=60) TEM-26SS manufactured by TOSHIBA MACHINE CO., LTD, thereby obtaining a resin composition.

In addition, the total light transmittance of the molded plate that was measured using haze meter NDH2000 manufactured by NIPPON DENSHOKU INDUSTRIES Co., LTD. was 85%. The results are shown together in Table 3.

Example 8

95.0 parts by weight of polypropylene (polypropylene F107 manufactured by Prime Polymer Co., Ltd., MFR of 6.6 g/10 min) was dry-blended with 5.0 parts by weight of the silylated polyolefin (A-2), and the resultant was melted and mixed at a cylinder temperature of 200° C. by using a double screw extruder (L/D=60) TEM-26SS manufactured by TOSHIBA MACHINE CO., LTD, thereby obtaining a resin composition.

This resin composition was subjected to injection molding under conditions of a cylinder temperature of 200° C. and a mold temperature of 40° C., by using an injection molding machine NEX30-3E manufactured by Nissei Plastic Industrial Co., Ltd., thereby obtaining an injection-molded plate having a size of 70 mm×70 mm×2 mm.

The abrasion loss and friction coefficient of the obtained injection-molded plate were measured in accordance with JIS K7218A (load: 75N, speed: 0.1 m/s, distance: 3 km). As a result, the abrasion loss was 0.003 g, and the friction coefficient was 0.22. Moreover, the opposite material used for the measurement was S45C.

In addition, the total light transmittance of the molded plate that was measured using haze meter NDH2000 manufactured by NIPPON DENSHOKU INDUSTRIES Co., LTD. was 84%. The results are shown together in Table 3.

Example 9

95.0 parts by weight of linear low-density polyethylene (linear low-density polyethylene SP0540 manufactured by Prime Polymer Co., Ltd., MFR of 3.8 g/10 min) was dry-blended with 5.0 parts by weight of the silylated polyolefin (A-2), and the resultant was melted and mixed at a cylinder temperature of 200° C. by using a double screw extruder (L/D=60) TEM-26SS manufactured by TOSHIBA MACHINE CO., LTD, thereby obtaining a resin composition.

This resin composition was subjected to injection molding under conditions of a cylinder temperature of 200° C. and a mold temperature of 40° C., by using an injection molding machine NEX30-3E manufactured by Nissei Plastic Industrial Co., Ltd., thereby obtaining an injection-molded plate having a size of 70 mm×70 mm×2 mm.

The abrasion loss and friction coefficient of the obtained injection-molded plate were measured in accordance with JIS K7218A (load: 75N, speed: 0.1 m/s, distance: 3 km). As a result, the abrasion loss was 0.076 g, and the friction coefficient was 0.53. Moreover, the opposite material used for the measurement was S45C.

In addition, the total light transmittance of the molded plate that was measured using haze meter NDH2000 manufactured by NIPPON DENSHOKU INDUSTRIES Co., LTD. was 77%. The results are shown together in Table 3.

Example 10

95.0 parts by weight of an ethylene-vinyl acetate copolymer (ethylene-vinyl acetate copolymer EV460 manufactured by Dupont-Mitsui Polychemicals Co., Ltd., MFR of 2.5 g/10 min) was dry-blended with 5.0 parts by weight of the silylated polyolefin (A-2), and the resultant was melted and mixed at a cylinder temperature of 200° C. by using a double screw extruder (L/D=60) TEM-26SS manufactured by TOSHIBA MACHINE CO., LTD, thereby obtaining a resin composition.

This resin composition was subjected to injection molding under conditions of a cylinder temperature of 200° C. and a mold temperature of 40° C., by using an injection molding machine NEX30-3E manufactured by Nissei Plastic Industrial Co., Ltd., thereby obtaining an injection-molded plate having a size of 70 mm×70 mm×2 mm.

The abrasion loss and friction coefficient of the obtained injection-molded plate were measured in accordance with JIS K7218A (load: 75 N, speed: 0.1 m/s, distance: 0.5 km). As a result, the abrasion loss was 0.300 g, and the friction coefficient was 0.55. Moreover, the opposite material used for the measurement was S45C.

In addition, the total light transmittance of the molded plate that was measured using haze meter NDH2000 manufactured by NIPPON DENSHOKU INDUSTRIES Co., LTD. was 76%. The results are shown together in Table 3.

Example 11

95.0 parts by weight of an ethylene-methacrylic acid copolymer (ethylene-methacrylic acid copolymer N1108C manufactured by Dupont-Mitsui Polychemicals Co., Ltd., MFR of 8.0 g/10 min) was dry-blended with 5.0 parts by weight of the silylated polyolefin (A-2), and the resultant was melted and mixed at a cylinder temperature of 200° C. by using a double screw extruder (L/D=60) TEM-26SS manufactured by TOSHIBA MACHINE CO., LTD, thereby obtaining a resin composition.

This resin composition was subjected to injection molding under conditions of a cylinder temperature of 200° C. and a mold temperature of 40° C., by using an injection molding machine NEX30-3E manufactured by Nissei Plastic Industrial Co., Ltd., thereby obtaining an injection-molded plate having a size of 70 mm×70 mm×2 mm.

The abrasion loss and friction coefficient of the obtained injection-molded plate were measured in accordance with JIS K7218A (load: 75 N, speed: 0.1 m/s, distance: 1.5 km). As a result, the abrasion loss was 0.009 g, and the friction coefficient was 0.47. Moreover, the opposite material used for the measurement was S45C.

In addition, the total light transmittance of the molded plate that was measured using haze meter NDH2000 manufactured by NIPPON DENSHOKU INDUSTRIES Co., LTD. was 74%. The results are shown together in Table 3.

Comparative Example 4

An injection-molded plate having a size of 70 mm×70 mm×2 mm was obtained in the same manner as in Example 6, except that the silylated polyolefin (A-1) was not used in Example 6.

The abrasion loss and friction coefficient of the obtained injection-molded plate were measured in accordance with JIS K7218A (load: 75N, speed: 0.1 m/s, distance: 3 km). As a result, the abrasion loss was 0.195 g, and the friction coefficient was 0.55. Moreover, the opposite material used for the measurement was S45C. From the above results, it was clarified that the abrasion loss and friction coefficient increase compared to the case (Examples 6 to 8) where silylated polyolefin (A-1 and A-2) is used.

In addition, the total light transmittance of the molded plate that was measured using haze meter NDH2000 manufactured by NIPPON DENSHOKU INDUSTRIES Co., LTD. was 86%. The results are shown together in Table 3.

Comparative Example 5

97.8 parts by weight of polypropylene (polypropylene F107 manufactured by Prime Polymer Co., Ltd., MFR of 6.6 g/10 min) was dry-blended with 2.2 parts by weight of the silicone-modified polyethylene (G-1), and the resultant was melted and mixed at a cylinder temperature of 200° C. by using a double screw extruder (L/D=60) TEM-26SS manufactured by TOSHIBA MACHINE CO., LTD, thereby obtaining a resin composition.

This resin composition was subjected to injection molding under conditions of a cylinder temperature of 200° C. and a mold temperature of 40° C., by using an injection molding machine NEX30-3E manufactured by Nissei Plastic Industrial Co., Ltd., thereby obtaining an injection-molded plate having a size of 70 mm×70 mm×2 mm.

The abrasion loss and friction coefficient of the obtained injection-molded plate were measured in accordance with JIS K7218A (load: 75N, speed: 0.1 m/s, distance: 3 km). As a result, the abrasion loss was 0.001 g, and the friction coefficient was 0.21. Moreover, the opposite material used for the measurement was S45C.

In addition, the total light transmittance of the molded plate that was measured using haze meter NDH2000 manufactured by NIPPON DENSHOKU INDUSTRIES Co., LTD. was 75%. From this result, it was clarified that the total light transmittance deteriorates compared to the case (Examples 6 to 8) where silylated polyolefin (A-1 and A-2) is used. The results are shown together in Table 3.

Comparative Example 6

97.4 parts by weight of polypropylene (polypropylene F107 manufactured by Prime Polymer Co., Ltd., MFR of 6.6 g/10 min) was dry-blended with 2.6 parts by weight of a master batch (G-2) (silicone concentrate BY27-001 manufactured by Dow Corning Toray Co., Ltd., MFR 15 g/10 min) including ultrahigh molecular-weight silicone and polypropylene, and the resultant was melted and mixed at a cylinder temperature of 200° C. by using a double screw extruder (L/D=60) TEM-2655 manufactured by TOSHIBA MACHINE CO., LTD, thereby obtaining a resin composition.

This resin composition was subjected to injection molding under conditions of a cylinder temperature of 200° C. and a mold temperature of 40° C., by using an injection molding machine NEX30-3E manufactured by Nissei Plastic Industrial Co., Ltd., thereby obtaining an injection-molded plate having a size of 70 mm×70 mm×2 mm.

The abrasion loss and friction coefficient of the obtained injection-molded plate were measured in accordance with JIS K7218A (load: 75N, speed: 0.1 m/s, distance: 3 km). As a result, the abrasion loss was 0.004 g, and the friction coefficient was 0.55. Moreover, the opposite material used for the measurement was S45C.

In addition, the total light transmittance of the molded plate that was measured using haze meter NDH2000 manufactured by NIPPON DENSHOKU INDUSTRIES Co., LTD. was 51%. From this result, it was clarified that the total light transmittance deteriorates compared to the case (Examples 6 to 8) where silylated polyolefin (A-1 and A-2) is used. The results are shown together in Table 3.

Comparative Example 7

An injection-molded plate having a size of 70 mm×70 mm×2 mm was obtained in the same manner as in Example 9, except that the silylated polyolefin (A-2) was not used in Example 9.

The abrasion loss and friction coefficient of the obtained injection-molded plate were measured in accordance with JIS K7218A (load: 75N, speed: 0.1 m/s, distance: 3 km). As a result, the abrasion loss was 0.371 g, and the friction coefficient was 0.63. Moreover, the opposite material used for the measurement was S45C. From the above result, it was clarified that the abrasion loss and friction coefficient increase compared to the case (Example 9) where the silylated polyolefin (A-2) is used.

In addition, the total light transmittance of the molded plate that was measured using haze meter NDH2000 manufactured by NIPPON DENSHOKU INDUSTRIES Co., LTD. was 80%. The results are shown together in Table 3.

Comparative Example 8

An injection-molded plate having a size of 70 mm×70 mm×2 mm was obtained in the same manner as in Example 10, except that the silylated polyolefin (A-2) was not used in Example 10.

The abrasion loss and friction coefficient of the obtained injection-molded plate were measured in accordance with JIS K7218A (load: 75 N, speed: 0.1 m/s, distance: 0.5 km). As a result, the abrasion loss was 1.021 g, and the friction coefficient was 0.61. Moreover, the opposite material used for the measurement was S45C. From the above result, it was clarified that the abrasion loss and friction coefficient increase compared to the case (Example 10) where the silylated polyolefin (A-2) is used.

In addition, the total light transmittance of the molded plate that was measured using haze meter NDH2000 manufactured by NIPPON DENSHOKU INDUSTRIES Co., LTD. was 84%. The results are shown together in Table 3.

Comparative Example 9

An injection-molded plate having a size of 70 mm×70 mm×2 mm was obtained in the same manner as in Example 11, except that the silylated polyolefin (A-2) was not used in Example 11.

The abrasion loss and friction coefficient of the obtained injection-molded plate were measured in accordance with JIS K7218A (load: 75 N, speed: 0.1 m/s, distance: 1.5 km). As a result, the abrasion loss was 0.389 g, and the friction coefficient was 0.68. Moreover, the opposite material used for the measurement was S45C. From the above result, it was clarified that the abrasion loss and friction coefficient increase compared to the case (Example 11) where the silylated polyolefin (A-2) is used.

In addition, the total light transmittance of the molded plate that was measured using haze meter NDH2000 manufactured by NIPPON DENSHOKU INDUSTRIES Co., LTD. was 85%. The results are shown together in Table 3.

TABLE 3

| | Properties of silylated polyolefin | | | Composition | | | | |
|---|---|---|---|---|---|---|---|---|
| Name | Content of silylated polyolefin (% by weight) | MRF (g/10 min) | Base resin | Amount of silylated polyolefin added (wt %) | Amount of polyorganosiloxane added (% by weight) Calculated value | Abrasion loss (g) | Friction coefficient | Total light transmittance (%) |
| Example 6 | A-1 | 46 | >100 | PP (F107) | 5 | 2.3 | 0.001 | 0.22 | 85 |
| Example 7 | A-1 | 46 | >100 | PP (F107) | 2.8 | 1.3 | 0.001 | 0.31 | 85 |
| Example 8 | A-2 | 26 | >100 | PP (F107) | 5 | 1.3 | 0.003 | 0.22 | 84 |
| Example 9 | A-2 | 26 | >100 | LLDPE (SP0540) | 5 | 1.3 | 0.076 | 0.53 | 77 |
| Example 10 | A-2 | 26 | >100 | EVA (EV460) | 5 | 1.3 | 0.300 | 0.55 | 76 |
| Example 11 | A-2 | 26 | >100 | EMAA (N1108C) | 5 | 1.3 | 0.009 | 0.47 | 74 |
| Comparative example 4 | — | — | — | PP (F107) | — | — | 0.195 | 0.55 | 86 |
| Comparative example 5 | G-1 | 60 | 0.7 | PP (F107) | 2.2 | 1.3 | 0.001 | 0.21 | 75 |
| Comparative example 6 | G-2 | 50 | 15 | PP (F107) | 2.6 | 1.3 | 0.004 | 0.55 | 51 |
| Comparative example 7 | — | — | — | LLDPE (SP0540) | — | — | 0.371 | 0.63 | 80 |
| Comparative example 8 | — | — | — | EVA (EV460) | — | — | 1.021 | 0.61 | 84 |

TABLE 3-continued

| | Properties of silylated polyolefin | | Composition | | | | | |
|---|---|---|---|---|---|---|---|---|
| Name | Content of silylated polyolefin (% by weight) | MRF (g/10 min) | Base resin | Amount of silylated polyolefin added (wt %) | Amount of polyorganosiloxane added (% by weight) Calculated value | Abrasion loss (g) | Friction coefficient | Total light transmittance (%) |
| Comparative example 9 | — | — | — | EMAA (N1108C) | — | — | 0.389 | 0.68 | 85 |

Example 12

94.3 parts by weight of polypropylene (polypropylene F107 manufactured by Prime Polymer Co., Ltd., MFR of 6.6 g/10 min) was dry-blended with 5.7 parts by weight of the silylated polyolefin (A-1), and the resultant was melted and mixed at a cylinder temperature of 200° C. by using a double screw extruder (L/D=60) TEM-26SS manufactured by TOSHIBA MACHINE CO., LTD, thereby obtaining a resin composition.

This resin composition was subjected to injection molding under conditions of a cylinder temperature of 200° C. and a mold temperature of 40° C., by using an injection molding machine NEX30-3E manufactured by Nissei Plastic Industrial Co., Ltd., thereby obtaining an injection-molded plate having a size of 70 mm×70 mm×2 mm. The surface Si concentration of the obtained injection-molded plate that was measured by ESCA was 0.035 (Si/C).

An adhesive tape (ICROS TAPE manufactured by Mitsui Chemicals Tohcello, Inc., SB-185HRB-KW40) cut into 50 mm×50 mm was adhered onto the surface of the obtained injection-molded plate, and the resultant was allowed to stand still for 24 hours at 25° C. After the adhesive tape was peeled from the injection-molded plate, ESCA measurement was performed on the adhesive face, and as a result, the surface Si concentration was 0.001 (Si/C). The results are shown together in Table 4.

Example 13

The same operation as in Example 12 was performed, except that the injection-molded plate was allowed to stand still for 24 hours at 60° C. after the adhesive tape was adhered onto the plate. ESCA measurement was performed on the adhesive face, and as a result, the surface Si concentration was 0.003 (Si/C). The results are shown together in Table 4.

Example 14

90.0 parts by weight of polypropylene (polypropylene F107 manufactured by Prime Polymer Co., Ltd., MFR of 6.6 g/10 min) was dry-blended with 10.0 parts by weight of the silylated polyolefin (A-2), and the resultant was melted and mixed at a cylinder temperature of 200° C. by using a double screw extruder (L/D=60) TEM-26SS manufactured by TOSHIBA MACHINE CO., LTD, thereby obtaining a resin composition.

This resin composition was subjected to injection molding under conditions of a cylinder temperature of 200° C. and a mold temperature of 40° C., by using an injection molding machine NEX30-3E manufactured by Nissei Plastic Industrial Co., Ltd., thereby obtaining an injection-molded plate having a size of 70 mm×70 mm×2 mm. The surface Si concentration of the obtained injection-molded plate that was measured by ESCA was 0.037 (Si/C).

An adhesive tape (ICROS TAPE manufactured by Mitsui Chemicals Tohcello, Inc., SB-185HRB-KW40) cut into 50 mm×50 mm was adhered onto the surface of the obtained injection-molded plate, and the resultant was allowed to stand still for 24 hours at 25° C. After the adhesive tape was peeled from the injection-molded plate, ESCA measurement was performed on the adhesive face, and as a result, the surface Si concentration was equal to or lower than the detection limit. The results are shown together in Table 4.

Example 15

The same operation as in Example 14 was performed, except that the injection-molded plate was allowed to stand still for 24 hours at 60° C. after the adhesive tape was adhered onto the plate. ESCA measurement was performed on the adhesive face, and as a result, the surface Si concentration was equal to or lower than the detection limit. The results are shown together in Table 4.

Comparative Example 10

94.8 parts by weight of polypropylene (polypropylene F107 manufactured by Prime Polymer Co., Ltd., MFR of 6.6 g/10 min) was dry-blended with 5.2 parts by weight of a master batch (G-2) (silicone concentrate BY27-001 manufactured by Dow Corning Toray Co., Ltd., MFR 15 g/10 min) including ultrahigh molecular-weight silicone and polypropylene, and the resultant was melted and mixed at a cylinder temperature of 200° C. by using a double screw extruder (L/D=60) TEM-2655 manufactured by TOSHIBA MACHINE CO., LTD, thereby obtaining a resin composition.

This resin composition was subjected to injection molding under conditions of a cylinder temperature of 200° C. and a mold temperature of 40° C., by using an injection molding machine NEX30-3E manufactured by Nissei Plastic Industrial Co., Ltd., thereby obtaining an injection-molded plate having a size of 70 mm×70 mm×2 mm. The surface Si concentration of the obtained injection-molded plate that was measured by ESCA was 0.043 (Si/C).

An adhesive tape (ICROS TAPE manufactured by Mitsui Chemicals Tohcello, Inc., SB-185HRB-KW40) cut into 50 mm×50 mm was adhered onto the surface of the obtained injection-molded plate, and the resultant was allowed to stand still for 24 hours at 25° C. After the adhesive tape was peeled from the injection-molded plate, ESCA measurement was performed on the adhesive face, and as a result, the surface Si concentration was 0.017 (Si/C). The results are shown together in Table 4.

Comparative Example 11

The same operation as in Comparative example 10 was performed, except that the injection-molded plate was allowed to stand still for 24 hours at 60° C. after the adhesive tape was adhered onto the plate. ESCA measurement was performed on the adhesive face, and as a result, the surface Si concentration was 0.043 (Si/C). The results are shown together in Table 4.

(A-4) as a white solid. As a result of NMR analysis, the yield of the obtained silylated polyolefin (A-4) was 99%, the olefin conversion rate thereof was 100%, and the isomerization rate thereof was 1%. MFR was equal to or higher than the upper limit of measurement (MFR>100 g/10 min),

TABLE 4

| | Properties of silylated polyolefin | | | Composition | | | Surface Si concentration of molded article (Si/C), actually measured value | Concentration of Si transferred to adhesive (Si/C), actually measured value |
|---|---|---|---|---|---|---|---|---|
| Name | Content of polyorganosiloxane (% by weight) | MRF (g/10 min) | Base resin | Amount of silylated polyolefin added (% by weight) | Amount of polyorganosiloxane added (% by weight), calculated value | Temperature for adhering treatment (° C.) | | |
| Example 12 | A-1 | 46 | >100 | PP (F107) | 5.7 | 2.6 | 25 | 0.035 | 0.001 |
| Example 13 | A-1 | 46 | >100 | PP (F107) | 5.7 | 2.6 | 60 | 0.035 | 0.003 |
| Example 14 | A-2 | 26 | >100 | PP (F107) | 10 | 2.6 | 25 | 0.037 | Equal to or less than detection limit |
| Example 15 | A-2 | 26 | >100 | PP (F107) | 10 | 2.6 | 60 | 0.037 | Equal to or less than detection limit |
| Comparative example 10 | G-2 | 50 | 15 | PP (F107) | 5.2 | 2.6 | 25 | 0.043 | 0.017 |
| Comparative example 11 | G-2 | 50 | 15 | PP (F107) | 5.2 | 2.6 | 60 | 0.043 | 0.043 |

Synthesis Example 9

Preparation of Platinum Catalyst Composition (C-3)

In a 50 ml sample tube containing a magnetic stirrer chip, 0.50 g of platinum (II) chloride was suspended in hydrosilane B (10 ml) (HS(B), manufactured by Gelest, Inc., product number: MCR-H07), followed by stirring at room temperature under a nitrogen gas flow. After the stirring was performed for 190 hours, about 0.4 ml of the reaction solution was collected by a syringe and filtered using a 0.45 μm PTFE filter, and the filtrate was collected into a 10 ml sample tube, thereby obtaining a platinum catalyst composition (C-3) in which a platinum concentration was 3.8% by weight.

Synthesis Example 10

Introduction of Polyethylene Having Terminal Vinyl Group into Hydrosilane-3

10.0 g (11.8 mmol) of the ethylene polymer (P-1) containing a vinyl group on one terminal that was obtained in [Synthesis example 1] was put in a 300 ml two-neck flask. In a nitrogen atmosphere, 9.6 g (corresponding to 11.8 mmol as a Si—H group) of hydrosilane B (HS(B)) and 150 μl ($1.4 \times 10^{-6}$ mmol expressed in terms of Pt) of (C-3a) which was obtained by 200-fold diluting the platinum catalyst composition (C-3) prepared in [Synthesis example 9] with hydrosilane B (HS(B)) were added thereto. The above reactor was set into an oil bath of which the temperature was raised in advance to 130° C., followed by stirring. About 3 minutes later, the polymer was melted. 6 hours later, the resultant was cooled, about 200 ml of methanol was then added thereto, and the content was taken out to a 300 ml beaker, followed by stirring for 2 hours. Subsequently, the solid was collected by filtration, washed with methanol, and dried at 60° C. under reduced pressure of equal to or less than 2 hPa, thereby obtaining 19.2 g of silylated polyolefin and the content of polyorganosiloxane in (A-4) calculated from the molecular formula was 46% by weight.

Synthesis Example 11

Introduction of Polyethylene Having Terminal Vinyl Group into Hydrosilane-4

25.1 g (11.8 mmol) of the ethylene polymer (P-2) containing a vinyl group on one terminal that was obtained in [Synthesis example 2] was put in a 300 ml two-neck flask. In a nitrogen atmosphere, 9.4 g (corresponding to 11.8 mmol as a Si—H group) of hydrosilane B (HS(B)) and 150 μl ($1.4 \times 10^{-6}$ mmol expressed in terms of Pt) of (C-3a) which was obtained by 200-fold diluting the platinum catalyst composition (C-3) prepared in [Synthesis example 9] with hydrosilane B (HS(B)) were added thereto. The above reactor was set into an oil bath of which the temperature was raised in advance to 130° C., followed by stirring. About 3 minutes later, the polymer was melted. 6 hours later, the resultant was cooled, about 200 ml of methanol was then added thereto, and the content was taken out to a 300 ml beaker, followed by stirring for 2 hours. Subsequently, the solid was collected by filtration, washed with methanol, and dried at 60° C. under reduced pressure of equal to or less than 2 hPa, thereby obtaining 34.1 g of silylated polyolefin (A-5) as a white solid. As a result of NMR analysis, the yield of the obtained silylated polyolefin (A-5) was 99%, the olefin conversion rate thereof was 100%, and the isomerization rate thereof was 2%. MFR was equal to or higher than the upper limit of measurement (MFR>100 g/10 min), and the content of polyorganosiloxane in (A-5) calculated from the molecular formula was 26% by weight.

Example 16

94.3 parts by weight of polypropylene (polypropylene F107 manufactured by Prime Polymer Co., Ltd., MFR of 6.6 g/10 min) was dry-blended with 5.7 parts by weight of the silylated polyolefin (A-4), and the resultant was melted and mixed at a cylinder temperature of 200° C. by using a double screw extruder (L/D=60) TEM-26SS manufactured by TOSHIBA MACHINE CO., LTD, thereby obtaining a resin composition.

This resin composition was subjected to injection molding under conditions of a cylinder temperature of 200° C. and a mold temperature of 40° C., by using an injection molding machine NEX30-3E manufactured by Nissei Plastic Industrial Co., Ltd., thereby obtaining an injection-molded plate having a size of 70 mm×70 mm×2 mm. The surface Si concentration of the obtained injection-molded plate that was measured by ESCA was 0.044 (Si/C).

An adhesive tape (ICROS TAPE manufactured by Mitsui Chemicals Tohcello, Inc., SB-185HRB-KW40) cut into 50 mm×50 mm was adhered onto the surface of the obtained injection-molded plate, and the resultant was allowed to stand still for 24 hours at 25° C. After the adhesive tape was peeled from the injection-molded plate, ESCA measurement was performed on the adhesive face, and as a result, the surface Si concentration was 0.012 (Si/C). The results are shown together in Table 5.

Example 17

The same operation as in Example 16 was performed, except that the injection-molded plate was allowed to stand still for 24 hours at 60° C. after the adhesive tape was adhered onto the plate. ESCA measurement was performed on the adhesive face, and as a result, the surface Si concentration was 0.017 (Si/C). The results are shown together in Table 5.

Example 18

90.0 parts by weight of polypropylene (polypropylene F107 manufactured by Prime Polymer Co., Ltd., MFR of 6.6 g/10 min) was dry-blended with 10.0 parts by weight of the silylated polyolefin (A-5), and the resultant was melted and mixed at a cylinder temperature of 200° C. by using a double screw extruder (L/D=60) TEM-26SS manufactured by TOSHIBA MACHINE CO., LTD, thereby obtaining a resin composition.

This resin composition was subjected to injection molding under conditions of a cylinder temperature of 200° C. and a mold temperature of 40° C., by using an injection molding machine NEX30-3E manufactured by Nissei Plastic Industrial Co., Ltd., thereby obtaining an injection-molded plate having a size of 70 mm×70 mm×2 mm. The surface Si concentration of the obtained injection-molded plate that was measured by ESCA was 0.037 (Si/C).

An adhesive tape (ICROS TAPE manufactured by Mitsui Chemicals Tohcello, Inc., SB-185HRB-KW40) cut into 50 mm×50 mm was adhered onto the surface of the obtained injection-molded plate, and the resultant was allowed to stand still for 24 hours at 25° C. After the adhesive tape was peeled from the injection-molded plate, ESCA measurement was performed on the adhesive face, and as a result, the surface Si concentration was 0.005 (Si/C). The results are shown together in Table 5.

Example 19

The same operation as in Example 18 was performed, except that the injection-molded plate was allowed to stand still for 24 hours at 60° C. after the adhesive tape was adhered onto the plate. ESCA measurement was performed on the adhesive face, and as a result, the surface Si concentration was 0.005 (Si/C). The results are shown together in Table 5.

TABLE 5

| | Properties of silylated polyolefin | | | Composition | | | Surface Si concentration of molded article (Si/C), actually measured value | Concentration of Si transferred to adhesive (Si/C), actually measured value |
|---|---|---|---|---|---|---|---|---|
| | Name | Content of polyorganosiloxane (% by weight) | MRF (g/10 min) | Base resin | Amount of silylated polyolefin added (% by weight) | Amount of polyorganosiloxane added (% by weight), calculated value | Temperature for adhering treatment (° C.) | |
| Example 16 | A-4 | 46 | >100 | PP (F107) | 5.7 | 2.6 | 25 | 0.044 | 0.012 |
| Example 17 | A-4 | 46 | >100 | PP (F107) | 5.7 | 2.6 | 60 | 0.044 | 0.017 |
| Example 18 | A-5 | 26 | >100 | PP (F107) | 10 | 2.6 | 25 | 0.037 | 0.005 |
| Example 19 | A-5 | 26 | >100 | PP (F107) | 10 | 2.6 | 60 | 0.037 | 0.005 |

As examples and comparative examples clearly show, the molded article of the present invention has excellent scratch resistance and soil resistance, and bleed-out from the surface of the molded article is not easily caused. Moreover, in addition to the above performances, gas permeability thereof is also excellent. Therefore, the molded article is industrially important.

The present application claims priority based on Japanese Patent Application No. 2011-011172 filed on Jan. 21, 2011, the entire content of which is incorporated herein.

The invention claimed is:
1. A molded article formed of a composition comprising:
100 parts by weight of at least one kind of resin selected from the group consisting of thermoplastic resins and thermosetting resins; and
0.01 parts by weight to 10,000 parts by weight of a silylated polyolefin, which is obtained by a reaction between a silicon-containing compound containing a structural unit represented by Formula (2e) and a vinyl group-containing compound having a number average molecular weight of equal to or more than 700 and equal to or less than 10,000 that is measured by GPC, a derivative thereof, or a mixture of these,
wherein the vinyl group-containing compound has a structure represented by Formula (4') and a molecular weight distribution that falls within a range of 1.1 to 3.0,
wherein a reaction rate of the double bond of the vinyl group-containing compound is 90% or higher, wherein the molded article is formed of the composition by melt molding, $$HSi(CH_3)_2O\text{—}(\text{—}Si(CH_3)_2\text{—}O\text{—})_i\text{—}Si(CH_3)_2H \qquad (2e)$$

wherein, i represents an integer of equal to or more than 1 and equal to or less than 50, $$A\text{—}CH\text{=}CH_2 \qquad (4')$$

wherein A represents an ethylene homopolymer chain, and —CH=CH$_2$ presents only on the terminal of a main chain of the polymer,
with the proviso that the silylated polyolefin is not obtained by a reaction between a silicon-containing compound containing a structural unit represented by Formula (2e) and having two or more SiH groups per molecule and a compound having 2.0 or more vinyl groups on average per molecule as the vinyl group-containing compound.

2. The molded article according to claim 1,
wherein a melt mass-flow rate (MFR) of the silylated polyolefin that is measured at 190° C. under a load of 2.16 kg based on JIS K7210 is 0.01 g/10 min or higher.

3. The molded article according to claim 1,
wherein the thermoplastic resin is at least one kind selected from the group consisting of a polyolefin resin, a polycarbonate resin, a thermoplastic polyester resin, a polyamide resin, a polyimide resin, a polyurethane resin, and a polylactic acid resin.

4. The molded article according to claim 1,
wherein the thermosetting resin is at least one kind selected from the group consisting of an epoxy resin and a thermally cross-linkable polyolefin resin.

5. A molded article formed of a composition comprising:
100 parts by weight of at least one kind of resin selected from the group consisting of thermoplastic resins and thermosetting resins; and
0.01 parts by weight to 10,000 parts by weight of a silylated polyolefin, which is obtained by a reaction between a silicon-containing compound containing a structural unit represented by Formula (1) and a vinyl group-containing compound having a number average molecular weight of equal to or more than 100 and equal to or less than 500,000 that is measured by GPC, a derivative thereof, or a mixture of these, $$\text{—}Si(R^1)H\text{—}Y^1\text{—} \qquad (1)$$

wherein R$^1$ represents a hydrogen atom, a halogen atom, or a hydrocarbon group, and Y$^1$ represents O, S, or NR$^{30}$ and R$^{30}$ represents a hydrogen atom or a hydrocarbon group,
with the proviso that the silylated polyolefin is not obtained by a reaction between a silicon-containing compound containing a structural unit represented by Formula (1) and having two or more SiH groups per molecule and a compound having 2.0 or more vinyl groups on average per molecule as the vinyl group-containing compound,
wherein the vinyl group-containing compound is a (Z) olefin-diene copolymer satisfying the following (Z1) to (Z6):
(Z1) a copolymer which is obtained by copolymerizing ethylene with at least one kind of polyene, or a copolymer which is obtained by copolymerizing ethylene with at least one kind of olefin selected from a-olefins having 3 to 12 carbon atoms and at least one kind of polyene,
(Z2) unsaturated groups per molecule is from 0.5 to 3.0, (Z3) a density is from 870 mg/m$^3$ to 980 kg/m$^3$,
(Z4) a melting point is from 70° C. to 130° C.,
(Z5) a number average molecular weight (Mn) is from 400 to 5,000,
(Z6) a ratio (Mw/Mn) of a weight average molecular weight (Mw) to a number average molecular weight (Mn) is equal to or less than 4.0.

6. The molded article according to claim 5,
wherein the polyene of (Z1) is 5-vinylcyclo[2.2.1]hept-2-ene.

7. A molded article formed of a composition comprising:
100 parts by weight of at least one kind of resin selected from the group consisting of thermoplastic resins and thermosetting resins; and
0.01 parts by weight to 10,000 parts by weight of a silylated polyolefin, which is obtained by a reaction between a silicon-containing compound containing a structural unit represented by Formula (2e) and a vinyl group-containing compound having a number average molecular weight of equal to or more than 700 and equal to or less than 10,000 that is measured by GPC, a derivative thereof, or a mixture of these,
wherein the vinyl group-containing compound has a structure represented by Formula (4') and a molecular weight distribution that falls within a range of 1.1 to 3.0,
wherein a reaction rate of the double bond of the vinyl group-containing compound is 90% or higher,
wherein the molded article is in the form of a film or a sheet, $$HSi(CH_3)_2O\text{—}(\text{—}Si(CH_3)_2\text{—}O\text{—})_i\text{—}Si(CH_3)_2H \qquad (2e)$$

wherein, i represents an integer of equal to or more than 1 and equal to or less than 50, $$A\text{—}CH\text{=}CH_2 \qquad (4')$$

wherein A represents an ethylene homopolymer chain, and —CH=CH$_2$ presents only on the terminal of a main chain of the polymer,
with the proviso that the silylated polyolefin is not obtained by a reaction between a silicon-containing compound containing a structural unit represented by Formula (2e) and having two or more SiH groups per molecule and a compound having 2.0 or more vinyl groups on average per molecule as the vinyl group-containing compound.

8. The molded article according to claim 7,
wherein a melt mass-flow rate (MFR) of the silylated polyolefin that is measured at 190° C. under a load of 2.16 kg based on JIS K7210 is 0.01 g/10 min or higher.

9. The molded article according to claim 7,
wherein the thermoplastic resin is at least one kind selected from the group consisting of a polyolefin resin, a polycarbonate resin, a thermoplastic polyester resin, a polyamide resin, a polyimide resin, a polyurethane resin, and a polylactic acid resin.

10. The molded article according to claim 7,
wherein the thermosetting resin is at least one kind selected from the group consisting of an epoxy resin and a thermally cross-linkable polyolefin resin.

11. A molded article formed of a composition comprising:
100 parts by weight of at least one kind of resin selected from the group consisting of thermoplastic resins and thermosetting resins; and
0.01 parts by weight to 10,000 parts by weight of a silylated polyolefin, which is obtained by a reaction between a silicon-containing compound containing a structural unit represented by Formula (2e) and a vinyl group-containing compound having a number average molecular weight of equal to or more than 700 and equal to or less than 10,000 that is measured by GPC, a derivative thereof, or a mixture of these,
wherein the vinyl group-containing compound has a structure represented by Formula (4') and a molecular weight distribution that falls within a range of 1.1 to 3.0,
wherein a reaction rate of the double bond of the vinyl group-containing compound is 90% or higher,
wherein the molded article is selected from an automobile interior part, a glass run channel, a plastic syringe, a packing material, a plastic container, a hollow fiber membrane, a gas-permeable film, and a gas-selective film, $$\text{HSi(CH}_3)_2\text{O—(—Si(CH}_3)_2\text{—O—)}_i\text{—Si(CH}_3)_2\text{H} \qquad (2e)$$

wherein, i represents an integer of equal to or more than 1 and equal to or less than 50, $$\text{A—CH=CH}_2 \qquad (4')$$

wherein A represents an ethylene homopolymer chain, and —CH=CH$_2$ presents only on the terminal of a main chain of the polymer,
with the proviso that the silylated polyolefin is not obtained by a reaction between a silicon-containing compound containing a structural unit represented by Formula (2e) and having two or more SiH groups per molecule and a compound having 2.0 or more vinyl groups on average per molecule as the vinyl group-containing compound.

12. The molded article according to claim 11,
wherein a melt mass-flow rate (MFR) of the silylated polyolefin that is measured at 190° C. under a load of 2.16 kg based on JIS K7210 is 0.01 g/10 min or higher.

13. The molded article according to claim 11,
wherein the thermoplastic resin is at least one kind selected from the group consisting of a polyolefin resin, a polycarbonate resin, a thermoplastic polyester resin, a polyamide resin, a polyimide resin, a polyurethane resin, and a polylactic acid resin.

14. The molded article according to claim 11,
wherein the thermosetting resin is at least one kind selected from the group consisting of an epoxy resin and a thermally cross-linkable polyolefin resin.

* * * * *